(12) United States Patent
Sasaki et al.

(10) Patent No.: US 7,463,448 B2
(45) Date of Patent: Dec. 9, 2008

(54) THIN FILM MAGNETIC HEAD HAVING UPPER AND LOWER POLES AND A GAP FILM WITHIN A TRENCH

(75) Inventors: Yoshitaka Sasaki, Milpitas, CA (US); Takehiro Kamigama, Hong Kong (CN); Tatsushi Shimizu, Hong Kong (CN)

(73) Assignees: Headway Technologies, Inc., Milpitas, CA (US); SAE Magnetics (H.K.) Ltd., Shatin, N.T. (HK)

( * ) Notice: Subject to any disclaimer, the term of this patent is extended or adjusted under 35 U.S.C. 154(b) by 504 days.

(21) Appl. No.: 11/109,671

(22) Filed: Apr. 20, 2005

(65) Prior Publication Data

US 2006/0238916 A1    Oct. 26, 2006

(51) Int. Cl.
*G11B 5/187* (2006.01)
*G11B 5/23* (2006.01)

(52) U.S. Cl. ............ 360/119.01; 360/119.11; 360/125.71; 360/125.58

(58) Field of Classification Search ......... 360/119.01, 360/119.11, 125.71, 125.41, 125.42, 125.58
See application file for complete search history.

(56) References Cited

U.S. PATENT DOCUMENTS

| | | | |
|---|---|---|---|
| 5,802,700 A * | 9/1998 | Chen et al. | 29/603.14 |
| 6,043,959 A | 3/2000 | Crue et al. | |
| 6,259,583 B1 | 7/2001 | Fontana, Jr. et al. | |
| 6,560,076 B1 * | 5/2003 | Yazawa et al. | 360/317 |
| 6,768,611 B2 * | 7/2004 | Sato et al. | 360/125.44 |
| 6,885,519 B2 * | 4/2005 | Sasaki | 360/125.63 |
| 6,927,938 B2 * | 8/2005 | Sato | 360/125.57 |
| 2001/0009488 A1 * | 7/2001 | Sato | 360/126 |
| 2002/0018317 A1 * | 2/2002 | Sato et al. | 360/126 |
| 2002/0030929 A1 * | 3/2002 | Sasaki | 360/126 |
| 2002/0067572 A1 * | 6/2002 | Anderson | 360/126 |
| 2002/0071209 A1 * | 6/2002 | Watanabe et al. | 360/126 |
| 2002/0154443 A1 * | 10/2002 | Kawasaki et al. | 360/126 |
| 2003/0193745 A1 * | 10/2003 | Sato | 360/126 |
| 2005/0068675 A1 | 3/2005 | Sasaki et al. | |
| 2005/0083607 A1 | 4/2005 | Sasaki et al. | |
| 2005/0128639 A1 | 6/2005 | Sasaki et al. | |
| 2005/0157423 A1 | 7/2005 | Sasaki et al. | |
| 2005/0185337 A1 | 8/2005 | Sasaki et al. | |

OTHER PUBLICATIONS

U.S. Appl. No. 11/134,447, filed May 23, 2005, Sasaki et al.
U.S. Appl. No. 11/109,671, filed Apr. 20, 2005, Sasaki et al.

* cited by examiner

*Primary Examiner*—Jefferson Evans
(74) *Attorney, Agent, or Firm*—Oblon, Spivak, McClelland, Maier & Neustadt, P.C.

(57) ABSTRACT

The present invention is directed to a thin-film magnetic head having no ATE (adjacent track erase) problem, a very narrow track width, an excellent O/W (overwrite) characteristic and a high switching speed. A lower pole film of a write element is provided on one face of a lower yoke film inside a trench portion provided in an inorganic insulating film. A gap film and an upper pole film are provided inside the trench portion on the lower pole portion. The trench portion has preferably an attached film made of an inorganic material on the inner wall faces facing the side faces of said lower pole film, said gap film and said upper pole film.

24 Claims, 39 Drawing Sheets

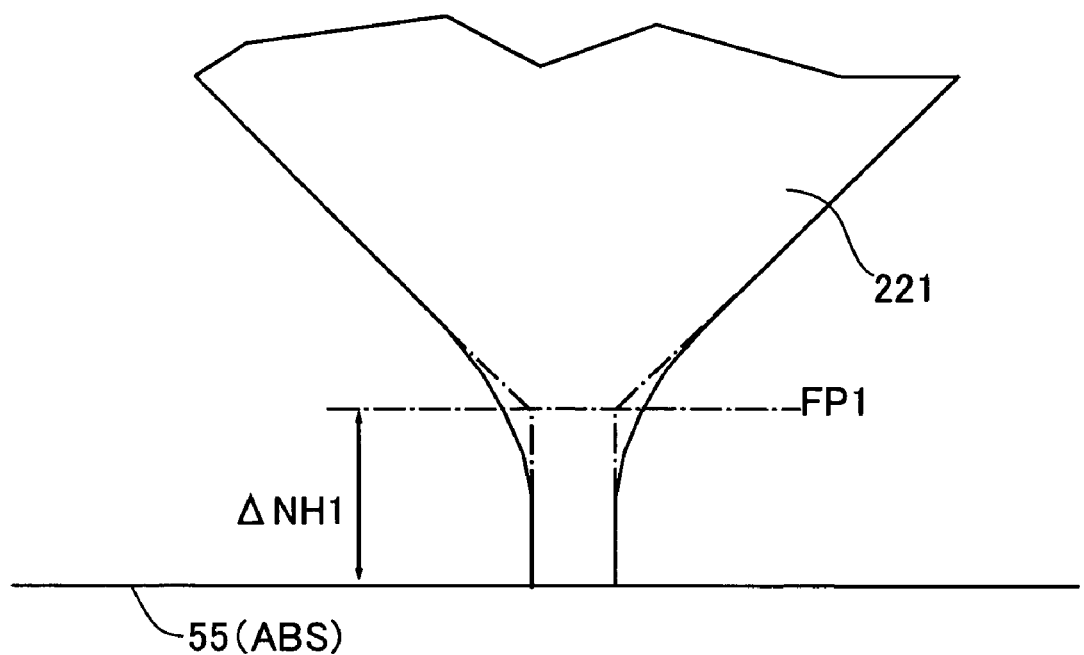
PRIOR ART  FIG.7
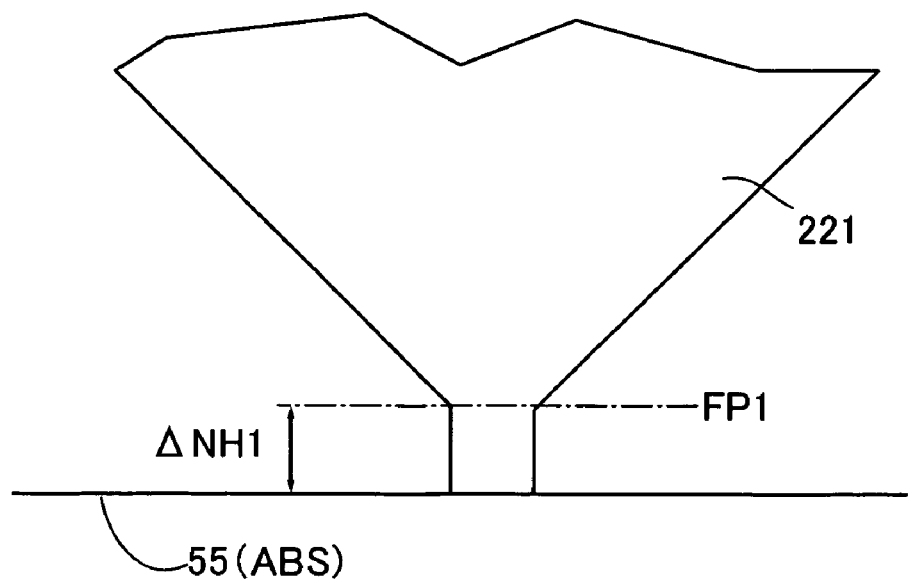
FIG.8

THIN FILM MAGNETIC HEAD HAVING UPPER AND LOWER POLES AND A GAP FILM WITHIN A TRENCH

BACKGROUND OF THE INVENTION

1. Field of the Invention

The present invention relates to a thin-film magnetic head and a method for manufacturing the same, and more particularly to improvement of a thin-film magnetic head for high-density recording.

2. Description of the Related Art

In recent years, the improvement in performance of a thin-film magnetic head is demanded with the improvement in surface recording density of a hard disk device. A thin-film magnetic head is composed of a stacked structure of a write element which aims at a write operation and a read element which aims at a read operation and uses a magnetoresistance effect. Particularly, a recent GMR head is so vigorous as to exceed 150 to 200 (GB/P) in surface recording density. A GMR film is of a multilayer structure obtained by combining a plurality of layers together. There are some kinds of mechanisms generating GMR and the layer structure of a GMR film varies according the mechanisms. A spin valve film (hereinafter, referred to as an SV film) and a ferromagnetic tunnel junction film (hereinafter, referred to as a TMR film) are known as a GMR film assuming a mass production.

On the one hand, the improvement in performance of a write element is also demanded with the improvement in performance of a read element. It is necessary to realize a narrow-track structure and enhance a track density in order to enhance the recording density by a write element. As a means for realizing a narrow-track structure, there is known a method of obtaining a tentative track width by applying a photolithography method and a plating method to an upper recording member and then adjusting the track width by means of a dry etching process such as RIE, IBE or the like.

However, a technique of obtaining a tentative track width by applying a photolithography method and a plating method and then adjusting the track width by means of a dry etching process such as RIE, IBE or the like has various problems. First, since a process of obtaining a tentative track width by applying a photolithography method and a plating method and then adjusting the track width by means of a dry etching process such as RIE, IBE or the like is performed after a pole portion comprising a lower pole film, a gap film and an upper pole film is formed on a lower yoke film, due to a shadow formed by an upper pole portion in IBE or RIE an etching rate is made lower at a rise-up part of the pole portion and is made higher as being more distant from the pole portion. Due to this, the surface of the lower yoke film is made lower as being more distant from the pole portion and is made high in the vicinity of the base of the pole portion, and what is called a trim shoulder is formed. The existence of a trim shoulder causes a problem of adjacent track erase (ATE) in a write operation of data to a magnetic recording medium due to magnetic flux leaking from the trim shoulder portion.

Second, the upper pole portion is generally expanded in area at the rear part in case of being seen from the pole end face to be an air bearing surface (hereinafter, referred to as ABS) and has a flare point to be the starting point of expansion in area. The distance from the pole end face to the flare point must be set at a constant value as short as possible. The reason is that shortening the distance from the pole end face to the flare point is effective for improving the characteristic of overwrite (hereinafter, referred to as O/W characteristic, sharpening the rise-up characteristic of a write operation, and increasing the switching speed.

However, in a technique of making the track width minute by means of IBE or RIE, shortening the flare point is limited and additionally the flare point is changed (shifted) and furthermore it is difficult to form a definite flare point.

As a means for improving the characteristics of a thin-film magnetic head, there has been known techniques disclosed in the specification of U.S. Pat. No. 6,043,959 and the specification of U.S. Pat. No. 6,259,583B1, but any of them determines the pole width by means of photolithography and, in order to enhance the recording density, must further perform a submicron process on the pole portion by means of IBE or RIE and thereby realize a narrow-track structure. However, problems as described above hang about this submicron process. The above prior arts have disclosed no means for solving the problems.

SUMMARY OF THE INVENTION

An object of the present invention is to provide a thin-film magnetic head making an ATE phenomenon hard to occur in a write operation onto a magnetic recording medium and a method for manufacturing the same.

Another object of the present invention is to provide a thin-film magnetic head having a very narrow track width and being suitable for high-density recording and a method for manufacturing the same.

Further another object of the present invention is to provide a thin-film magnetic head making it possible to enhance the O/W characteristic and sharpen the rise-up characteristic of a write magnetic flux and thereby increase the switching speed, and a method for manufacturing the same.

Still further another object of the present invention is to provide a thin-film magnetic head capable of exactly controlling the track width at an extremely high accuracy, and a method for manufacturing the same.

In order to attain the above-mentioned objects, in a thin-film magnetic head according to the present invention, a write element comprises a lower yoke film, a first insulating film, a lower pole film, a gap film and an upper pole film. Said first insulating film is made of an inorganic insulating material, is provided on the surface of said lower yoke film and has a trench portion at least at a part corresponding to a magnetic pole end portion, and the surface of said lower yoke film appears on the bottom of said trench portion. Said lower pole film is a plated film attached to said surface of said lower yoke film on the bottom of said trench portion. Said gap film is a conductive non-magnetic film and a plated film attached to the surface of said magnetic pole end portion of said lower pole portion inside said trench portion. Said upper pole portion is a plated film attached to the surface of said gap film inside said trench portion.

As described above, in a thin-film magnetic head according to the present invention, the lower pole film of a write element is a plated film provided on one face of the lower yoke film, and said lower pole film is located inside a trench portion provided on an inorganic insulating film. Therefore, the lower pole film can be formed by plating inside a trench portion over the flattened lower yoke film. Due to this, a trim shoulder inevitably generated in case of using a technique of making the track width minute by means of IBE or RIE is not generated. Since no trim shoulder is generated, an ATE problem does not occur in a write operation onto a magnetic recording medium.

Inside a trench portion, there are arranged not only said lower pole film but also said gap film and said upper pole film.

For the upper pole portion a flare point can be set shortly with a high accuracy position determined depending on the shape of the trench portion. For the upper pole film, therefore, it is possible to shorten the distance from the pole end face to the flare point and thereby improve the O/W characteristic and to sharpen the rise-up characteristic of a write magnetic flux and thereby increase the switching speed.

Since a thin-film magnetic head according to the present invention determines the track width by means of the width of a trench portion as described above, it is possible to exactly control the track width at an extremely high accuracy by controlling the width of the trench portion. As its concrete structure, said trench portion can be of a structure having an attached film made of a non-magnetic material on the inner side faces of it. Due to this, said magnetic pole end face of said lower pole film and said magnetic pole end face of said upper pole film come to have a track width reduced by said attached film.

Said attached film is preferably a CVD (chemical vapor deposition) film using $Al_2O_3$ or the like, more preferably a CVD film using an atomic layer method, concretely an Al-CVD film. An Al-CVD film using an atomic layer method can be formed by alternately and intermittently jetting $H_2O$, $N_2O$, $H_2O_2$ and ozone gases, and $Al(CH_3)_3$ or $AlCl_3$ being a thin film forming material. A process temperature is kept in a range of 100 to 300° C., preferably 180 to 200° C.

According to Al-CVD using an atomic layer method, a film of 1 angstrom in thickness can be formed by one-shot gas jetting. Therefore, the width of a trench portion can be controlled in angstroms. This means that the track width determined by the width of a trench portion can be controlled substantially optionally with a high accuracy. In practice, the thickness of an Al-CVD film comes into a range of 5 to 50 nm.

Since a high-accuracy and super-fine process using a CVD film by means of an atomic layer method is also reflected directly in defining a flare point in an upper pole film, it is possible to control in angstroms the position of the flare point and the distance from a medium facing surface to the flare point. As an example, according to the present invention, the distance from a flare point to a medium facing surface can be set within a range of 0.1 to 0.5 μm.

In a thin-film magnetic head according to the present invention, said trench portion can comprise a narrow-width portion and a wide-width portion. Said narrow-width portion is the part for containing said magnetic pole end portion of said lower pole film and said magnetic pole end portion of said upper pole film, and for substantially determining the track width. Said wide-width portion is continuous to the rear of said narrow-width portion and said lower pole film is continuous in said narrow-width portion and said wide-width portion. Therefore, a write magnetic flux is concentrated onto the narrow-width portion from the wide-width portion.

Said gap film adjacent to said lower pole film may be continuous in said narrow-width portion and said wide-width portion or may be provided only on the narrow-width portion.

Said upper pole film adjacent to said gap film is expanded in area at the rear and the distance from the flare point to be the starting point of expansion in area to a surface facing the medium is within a range of 0.1 to 0.5 μm. This point is as described already.

A thin-film magnetic head according to the present invention can have a non-magnetic film for determining a throat height at the rear of said upper pole film. Said non-magnetic film may be attached onto said gap film, and may be of a structure in which the front part of it is attached to said lower pole film and the rear part rises up from said front part and is attached to said non-magnetic film.

A thin-film magnetic head according to the present invention comprises an upper yoke film and a thin-film coil as a general structure. Said upper yoke film connects magnetically said pole film with the rear part of said lower yoke film, and said thin-film coil excites a magnetic circuit going around through said lower yoke film, said lower pole film, said gap film, said upper pole film and said upper yoke film.

As a concrete aspect in the above-mentioned structure, it is possible to adopt a structure in which the space between the junction of said upper pole film with said lower yoke film and said lower pole film, said gap film and said upper pole film is filled up with a second insulating film, and said thin-film coil is formed on the surface of said second insulating film. In this case it is preferable that said second insulating film and said upper pole film are flattened so that their surfaces are in the same plane. According to this structure, since a thin-film coil can be formed on a flattened face, a coil pattern is improved in accuracy.

As another aspect, said lower yoke film can comprise a first lower yoke film and a second lower yoke film. Said first lower yoke film forms a flat face in surface, and said second lower yoke film is provided at a limited position on the surface of said first lower yoke film. Said lower pole film, said gap film and said upper pole film are provided on the surface of said second lower yoke film. In case of this structure the second lower yoke film is used as a seed layer for making the lower pole film.

In case of taking a structure described above, said thin-film coil can comprise a first thin-film coil and a second thin-film coil. Said first thin-film coil is provided between the junction of said upper pole film with said lower yoke film and said second lower yoke film. On said first thin-film coil, the space between the junction of said upper pole film with said lower yoke film and said lower pole film, said gap film and said upper pole film is filled up with said first insulating film. Said second thin-film coil is provided on said first insulating film. According to this structure, a magneto-motive force can be increased by the first and second thin-film coils.

It is preferable that the surfaces of said first insulating film and said upper pole film are flattened. According to this structure, the second thin-film coil can be improved in pattern accuracy.

Further another aspect may comprise a second upper pole film. Said second upper pole film is provided on said first upper pole film. In this case it is preferable that the surfaces of said second upper pole film and said second thin-film coil are flattened so as to be in the same plane. According to this flattening, the upper yoke film can be improved in pattern accuracy.

A thin-film magnetic head according to the present invention is generally of a composite type comprising not only a write element but also a read element. Said read element comprises a GMR element or a ferromagnetic tunnel junction film.

A thin-film magnetic head according to the present invention forms a magnetic recording and reproducing apparatus (magnetic disk apparatus) by being combined with a magnetic recording medium (magnetic disk). Said thin-film magnetic head performs magnetic recording and reproduction with said magnetic recording medium.

A thin-film magnetic head according to the present invention can be manufactured by the following method. First, an inorganic insulating film having a trench portion is formed on the part corresponding to a pole portion on one face of a lower yoke film. In this case, said trench portion is formed so that said one face of said lower yoke film is exposed on the bottom of the trench portion.

Next, a lower pole film, a gap film and an upper pole film are formed in order inside said trench portion by a plating method using the lower yoke film as a seed film.

As an additive and modificative process, after a trench portion is formed in the inorganic insulating film, a CVD film, for example, an $Al_2O_3$ film (Al-CVD film) is formed as an attached film on the inner wall faces of the trench portion by applying an atomic layer method and next, an Al-CVD film being on the inner side faces out of this Al-CVD film is left and the Al-CVD film being on the bottom is selectively removed and opened by means of RIE or the like. Due to this, the lower yoke film is exposed on the bottom of the trench portion.

After this, a lower pole film, a gap film and an upper pole film are formed in order by means of plating by using the whole or a part of the lower yoke film exposed in the opening as a seed electrode. As described already, since the width of a trench portion can be controlled optionally with a high accuracy in angstroms according to an atomic layer method, the track width results in being also capable of being controlled optionally with a high accuracy in angstroms.

In a manufacturing method according to the present invention, a necessary process is added and performed according to aspects described above. Their concrete examples are described in more detail with reference to the accompanying drawings. The drawings are only exemplifications.

BRIEF DESCRIPTION OF DRAWINGS

FIG. 7 is a magnified partial plan view of the upper yoke and upper pole films showing the problems in a conventional thin-film magnetic head.

FIG. 8 is a magnified partial plan view showing advantages of the present invention having a yoke and pole structure shown in FIGS. 3 to 6.

FIG. 15 is a diagram showing a state prior to forming a trench portion.

FIG. 16 is a front sectional view of FIG. 15.

FIG. 17 is a diagram showing a process of forming a trench portion.

FIG. 18 is a front sectional view of FIG. 17.

FIG. 19 is a sectional view of the state shown in FIGS. 17 and 18 seen from the left side (in the figure), omitting the hatchings.

FIG. 20 is a diagram showing an atomic CVD film forming process after the process shown in FIGS. 17 to 19.

FIG. 21 is a sectional view of FIG. 20 seen from the left side, omitting the hatchings.

FIG. 22 is a diagram showing a process after the process shown in FIGS. 20 and 21.

FIG. 23 is a sectional view of FIG. 22 seen from the left side, omitting the hatchings.

FIG. 24 is a diagram showing a process after the process shown in FIGS. 22 and 23.

FIG. 25 is a diagram showing a process after the process shown in FIG. 24.

FIG. 26 is a diagram showing a process after the process shown in FIG. 25.

FIG. 27 is a sectional view of FIG. 26 seen from the left side, omitting the hatchings.

FIG. 28 is a diagram showing a process after the process shown in FIGS. 26 and 27.

FIG. 29 is a sectional view of FIG. 28 seen from the left side, omitting the hatchings.

FIG. 30 is a diagram showing a process after the process shown in FIGS. 28 and 29.

FIG. 31 is a sectional view of FIG. 30 seen from the left side, omitting the hatchings.

FIG. 32 is a diagram showing a process after the process shown in FIGS. 30 and 31.

FIG. 33 is a sectional view of FIG. 32 seen from the left side, omitting the hatchings.

FIG. 34 is a diagram showing a process after the process shown in FIGS. 32 and 33.

FIG. 35 is a sectional view of FIG. 34 seen from the left side, omitting the hatchings.

FIG. 36 is a diagram showing a trench portion forming process.

FIG. 37 is a front sectional view of FIG. 36.

FIG. 38 is a left side sectional view of FIG. 36, omitting the hatchings.

FIG. 39 is a diagram showing a process after the process shown in FIGS. 36 to 38.

FIG. 40 is a left side sectional view of FIG. 39, omitting the hatchings.

FIG. 41 is a diagram showing a process after the process shown in FIGS. 39 and 40.

FIG. 42 is a front sectional view of FIG. 41.

FIG. 43 is a left side sectional view of FIG. 42, omitting the hatchings.

FIG. 44 is a diagram showing a process after the process shown in FIGS. 41 to 43.

FIG. 45 is a front sectional view of FIG. 44.

FIG. 46 is a left side sectional view of FIG. 45, omitting the hatchings.

FIG. 47 is a diagram showing a process after the process shown in FIGS. 44 to 46.

FIG. 48 is a front sectional view of FIG. 47.

FIG. 49 is a left side sectional view of FIG. 48, omitting the hatchings.

FIG. 50 is a diagram showing a process after the process shown in FIGS. 47 to 49.

FIG. 51 is a front sectional view of FIG. 50.

FIG. 52 is a left side sectional view of FIG. 51, omitting the hatchings.

FIG. 53 is a diagram showing a process after the process shown in FIGS. 50 to 52.

FIG. 54 is a front sectional view of FIG. 53.

FIG. 55 is a diagram showing a trench portion forming process.

FIG. 56 is a left side sectional view of FIG. 55, omitting the hatchings.

FIG. 57 is a diagram showing a process after the process shown in FIGS. 55 and 56.

FIG. 58 is a left side sectional view of FIG. 57, omitting the hatchings.

FIG. 59 is a diagram showing a process after the process shown in FIGS. 57 and 58.

FIG. 60 is a left side sectional view of FIG. 59, omitting the hatchings.

FIG. 61 is a diagram showing a process after the process shown in FIGS. 59 and 60.

FIG. 62 is a left side sectional view of FIG. 61, omitting the hatchings.

FIG. 63 is a diagram showing a process after the process shown in FIGS. 61 and 62.

FIG. 64 is a front sectional view of FIG. 63.

FIG. 65 is a left side sectional view of FIG. 64, omitting the hatchings.

FIG. 66 is a diagram showing a process after the process shown in FIGS. 63 to 65.

FIG. 67 is a sectional view of FIG. 66.

FIG. 68 is a magnified left side sectional view of FIG. 67, omitting the hatchings.

FIG. 69 is a diagram showing a process after the process shown in FIGS. 66 to 68.

FIG. 70 is a front sectional view of FIG. 69.

FIG. 71 is a magnified left side sectional view of FIG. 71, omitting the hatchings.

DETAILED DESCRIPTION OF THE PREFERRED EMBODIMENTS

1. Thin-Film Magnetic Head

Embodiment 1 of a Thin-Film Magnetic Head

Figure 1:
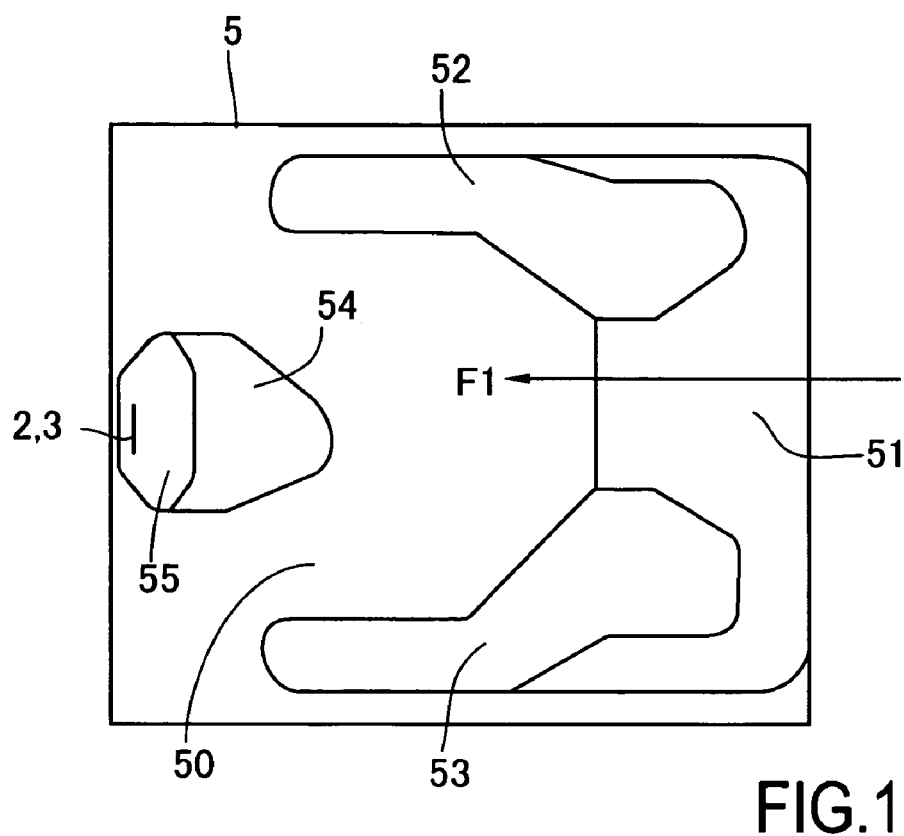
FIG. 1 is a bottom view of a thin-film magnetic head according to the present invention, seen from the medium facing surface side.
Figure 2:
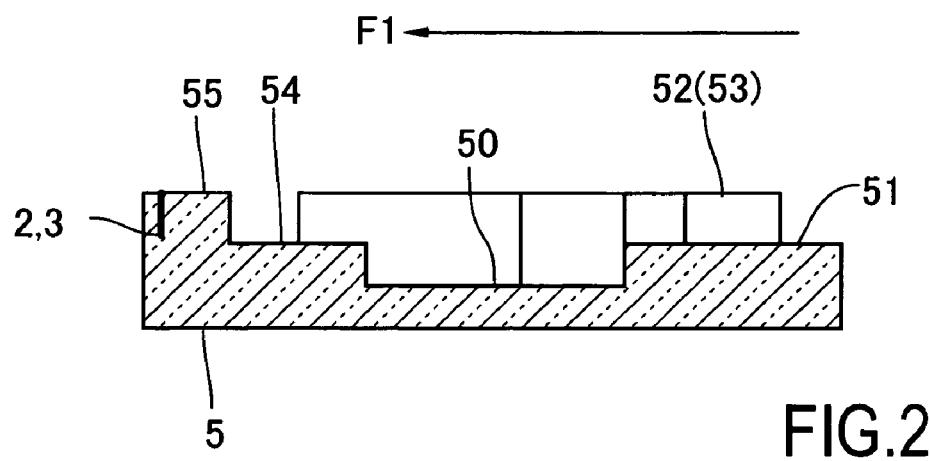
FIG. 2 is a sectional view of the thin-film magnetic head shown in FIG. 1.

Referring to FIGS. 1 and 2, a thin-film magnetic head according to the present invention comprises a slider 5, a write element 2 and a read element 3. The slider 5 is a ceramic structure using $Al_2O_3$, $SiO_2$ or the like on the surface of a base 15 made of $Al_2O_3$—TiC or the like, for example. The slider 5 has a geometrical shape for controlling a floating characteristic in the surface facing a medium. As a representative example of such a geometrical shape, there is shown an example being provided with a first step part 51, a second step part 52, a third step part 53, a fourth step part 54 and a fifth step part 55 on a base face 50 at the ABS side. The base face 50 becomes a negative pressure generating portion to an air flowing direction shown by arrow F1, and the second step part 52 and the third step part 53 form a step-shaped air bearing rising up from the first step part 51. The surfaces of the second step part 52 and the third step part 53 form an ABS. The fourth step part 54 stands up in the shape of a step from the base face 50 and the fifth step part 55 stands up in the shape of a step from the fourth step part 54. Electromagnetic transducer elements 2 and 3 are provided in the fifth step part 55.

The electromagnetic transducer elements 2 and 3 comprise a write element 2 and a read element 3. The write element 2 and the read element 3 are provided at the air flowing out end (trailing edge) side when being seen in the air flowing direction F1.

Figure 3:
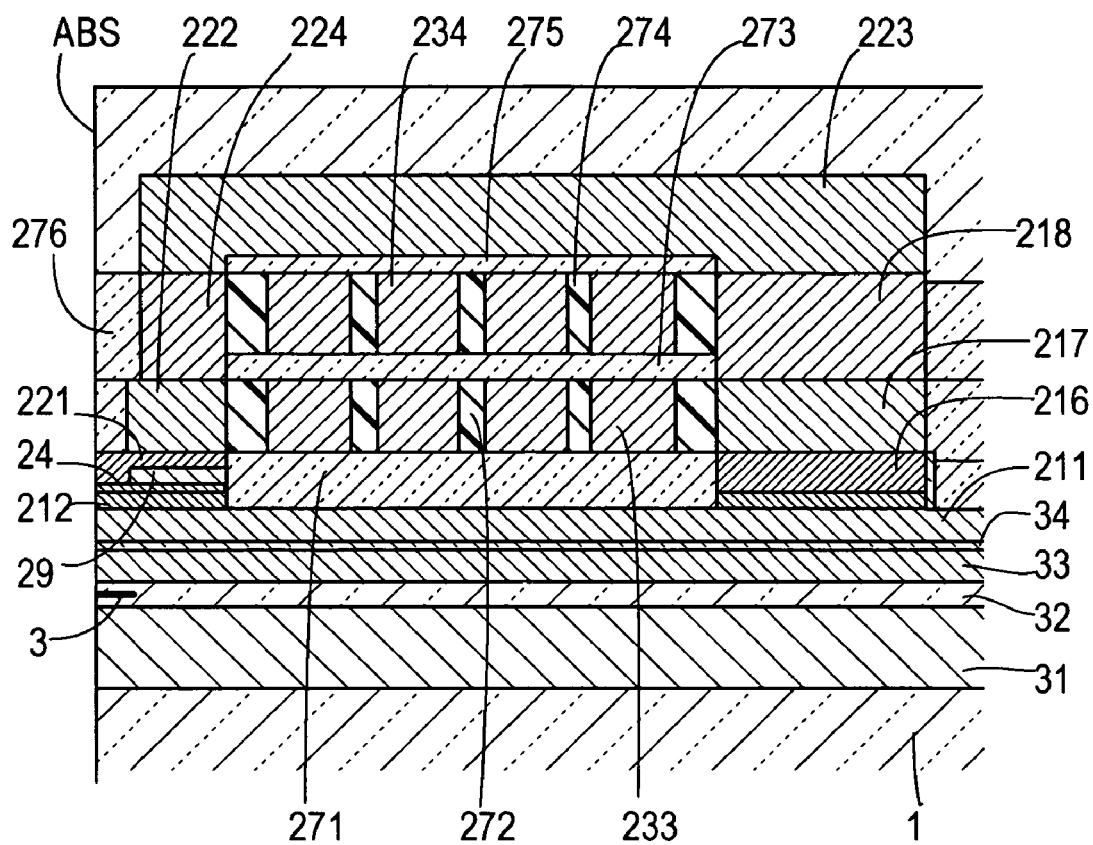
FIG. 3 is a magnified sectional view of a write element portion of the thin-film magnetic head shown in FIGS. 1 and 2.
Figure 4:
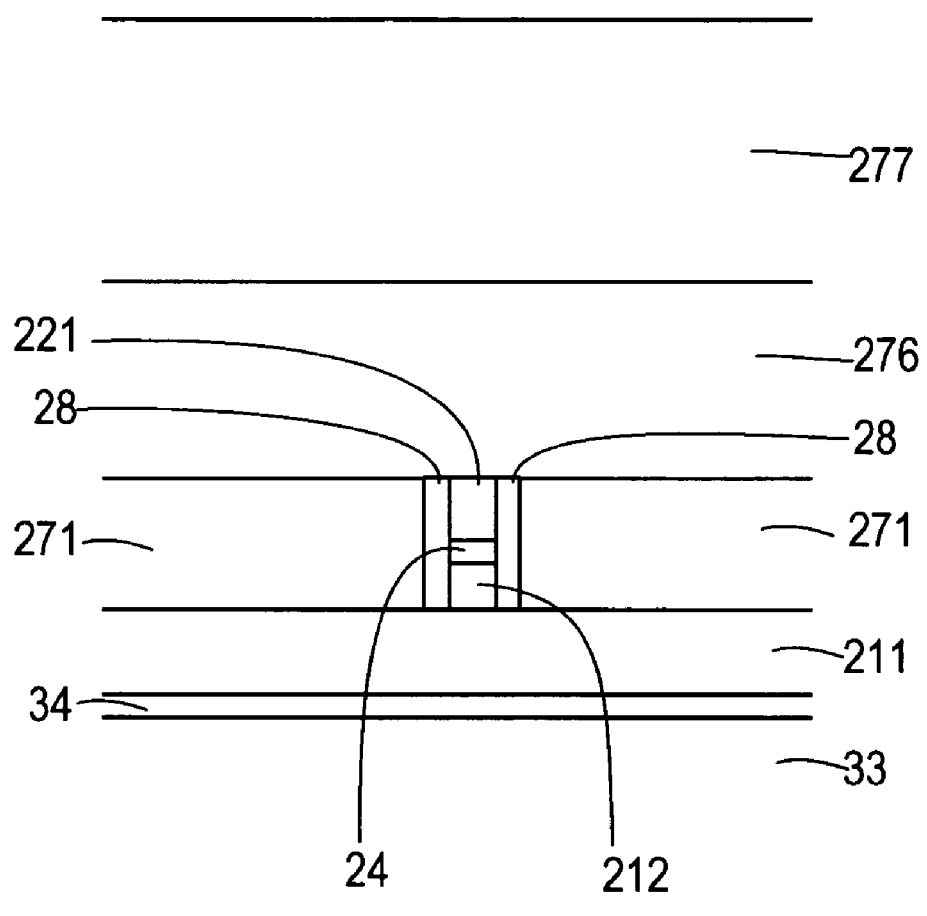
FIG. 4 is a magnified view of the write element shown in FIG. 3, seen from the medium facing surface side.
Figure 6:
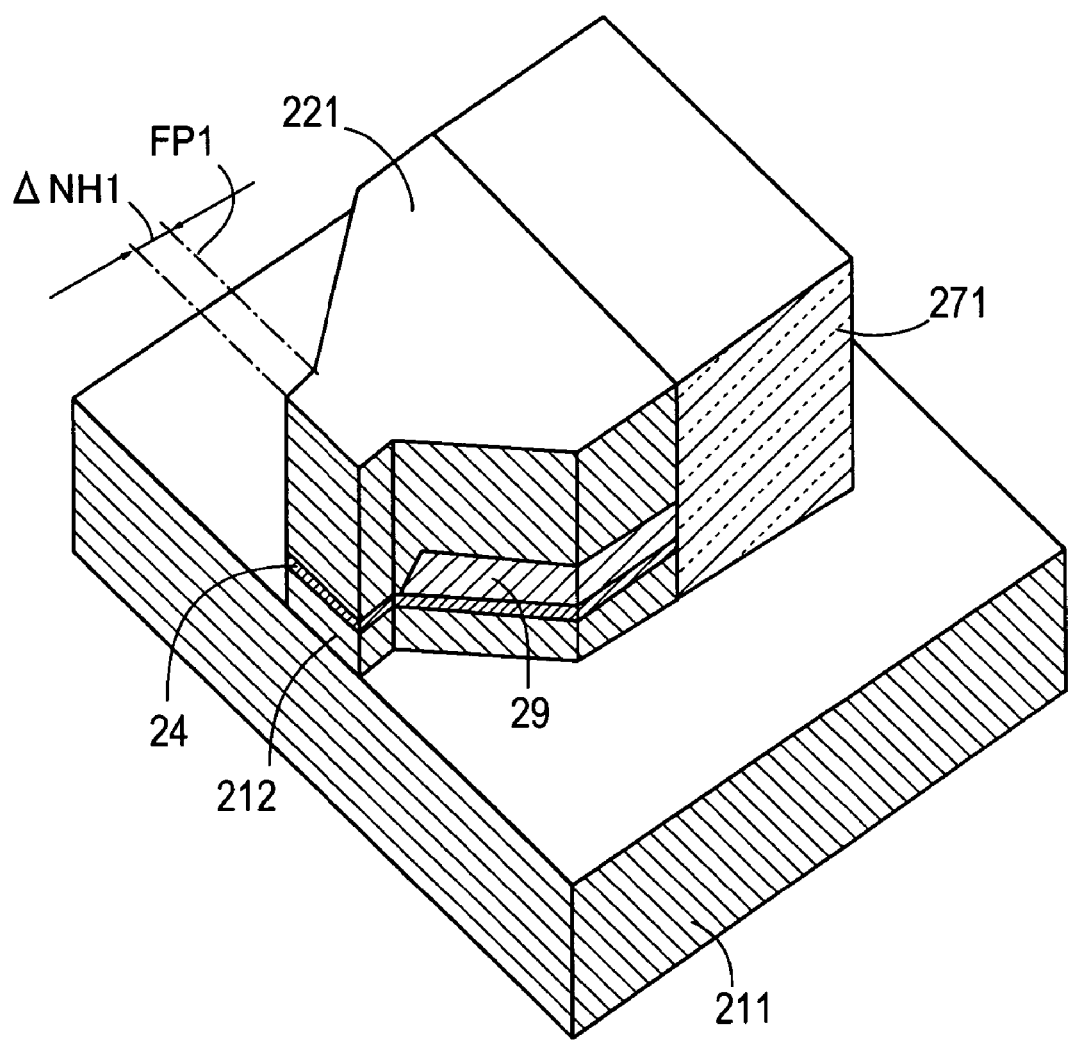
FIG. 6 is a perspective view showing the write element portion shown in FIGS. 3 to 5.

Referring to FIGS. 3 and 6, the write element 2 comprises a lower yoke film 211, an upper yoke film 223, a gap film 24, a lower pole film 212, upper pole films 221, 222 and 224, thin-film coils 233 and 234, and back gap films 216 to 218. The representations "lower" and "upper" are representations for only referring to illustrated embodiments, and the upper/lower relation may be inverted according to circumstances.

First, paying attention to a yoke structure, the lower yoke film 211 is supported by an insulating film 34 and the surface of it is made into a substantially flat plane. The insulating film 34 is formed out of an inorganic insulating material of $Al_2O_3$, $SiO_2$, AlN, DLC or the like for example. The lower yoke film 211 and the upper yoke film 223 can be selected from magnetic materials of NiFe, CoFe, CoFeN, CoNiFe, FeN, FeZrN or the like for example. Such lower and upper yoke films 211 and 223 can be formed by a frame plating method.

Next, paying attention to a pole structure, the lower pole film 212 is a plated film on one face of the lower yoke film 211. In short, the lower pole film 212 is formed by a plating method using the lower yoke film 211 as a seed electrode in relation to a manufacturing method. The lower pole film 212 can be concretely formed as a plated film of NiFe (80%:20%), NiFe (45%:55%) or CoNiFe (23 kG, 21 kG).

A first upper pole film 221 out of the upper pole films 221, 223 and 224 is adjacent to the gap film 24 and faces the lower pole film 212 with the gap film 24 between them. The first pole film 221 can be formed as a plated film of NiFe (80%: 20%), NiFe (45%:55%) or CoNiFe (23 kG, 21 kG). The gap film 24 is formed out of a non-magnetic metal material, for example, Ru, NiCu, Ta or the like.

A second upper pole film 222 is deposited on the first upper pole film, and further a third upper pole film 224 is deposited on the second upper pole film 222. The second upper pole film and the third upper pole film 224 each can be formed as a plated film of NiFe (80%:20%), NiFe (45%:55%) or CoNiFe (23 kG, 21 kG) similarly to the first upper pole film 221, and additionally can be also formed by a sputtered film of FeAlN, FeN, FeCo, CoFeN or FeZrN.

Correspondingly to the above-mentioned film structure in the pole portion, a first back gap film 216, a second back gap film 217 and a third back gap film 218 are deposited in order in the back gap portion. The first upper pole film 221 and the first back gap film 216 are formed at the same time in a process and have the same material and the same film thickness. The relation between the second upper pole film 222 and the second back gap film 217, and the relation between the third upper pole film 224 and the third back gap film 218 are the same as described above.

The first upper pole film 221 and the first back gap film 216 are flattened in surface together with an insulating film 271 existing between them by applying a chemical mechanical polishing (hereinafter, referred to as CMP) process for example.

Next, a thin-film coil structure comprises a first thin-film coil 233 and a second thin-film coil 234. The first thin-film coil 233 and the second thin-film coil 234 are spiral and formed out of a conductive metal material such as Cu (copper) and the like. The first thin-film coil 233 out of these coils is arranged on the flattened insulating film 271 and goes round the second back gap film 217. The periphery of the first thin-film coil 233 is filled up with a second insulating film 272 made of an organic insulating material (see FIG. 3). The second insulating film 272 is formed out of an organic insulating material. The first thin-film coil 233 and the second thin-film coil 272 are flattened in surface by CMP together with the second upper pole film 222 and the second back gap film 217 located at both sides of them. A third insulating film 273 is formed on the flattened face formed by the surfaces of the first thin-film coil 233 and the second insulating film 272. The third insulating film 273 is formed as a sputtered film of an inorganic insulating material such as $Al_2O_3$, $SiO_2$, AlN, DLC or the like.

The second thin-film coil 234 is arranged on the surface of the third insulating film 273 and goes round the third back gap film 218. The periphery of the second thin-film coil 234 is filled up with a fourth insulating film 274 made of an organic insulating material. The fourth insulating film 274 is formed out of an organic insulating material. The second thin-film coil 234 and the fourth insulating film 274 are flattened in surface by CMP together with the third upper pole film 224 and the third back gap film 218 located at both sides of them. A fifth insulating film 275 is formed on the flattened face formed by the surfaces of the second thin-film coil 234 and the fourth insulating film 274. Further, a sixth insulating film 276 is arranged outside the third upper pole film 224 and the third back gap film 218. The fifth insulating film 275 and the sixth insulating film 276 each are formed as a sputtered film of an inorganic insulating material such as $Al_2O3$, $SiO_2$, AlN, DLC or the like.

The upper yoke film 223 is connected to the fourth upper pole film 224 and the third back gap film 218 at both ends of it. The upper yoke film 223 is provided on the fifth insulating film 275 covering the surface of the flattened second thin-film coil 234 and is insulated from the second thin-film coil 234 by the fifth insulating film 275. The upper yoke film 223 extends to the rear of the medium facing surface 55 and is connected to the third back gap film 218. Due to this, a thin-film magnetic circuit going round through the lower yoke film 211, the lower pole film 212, the gap film 24, the first upper pole film 221, the upper yoke film 223 and the first to third back gap films 216 to 218 is completed.

A protective film 277 covers the whole of the write element 2. The protective film 277 is formed out of an inorganic insulating material such as $Al_2O_3$, $SiO_2$ or the like.

A lower shield film 31, an insulating film 32 and a second shield film 33 are provided in the vicinity of the read element 3. The lower shield film 31 and the second shield film 33 are formed out of NiFe and the like. The lower shield film 31 is formed on the surface of the base 1. In case that the base 1 is formed out of $Al_2O_3$—TiC and the like, the surface of the base 1 is provided with an insulating film of $Al_2O_3$, $SiO_2$ and the like, on which the lower shield film 31 is formed.

The read element 3 is arranged inside the insulating film 32 located between the lower shield film 31 and the second shield film 33. The end face of the read element 3 comes out at the medium facing surface 55. The read element 3 can be formed out of either of a spin valve film and a ferromagnetic tunnel junction element.

Figure 5A:
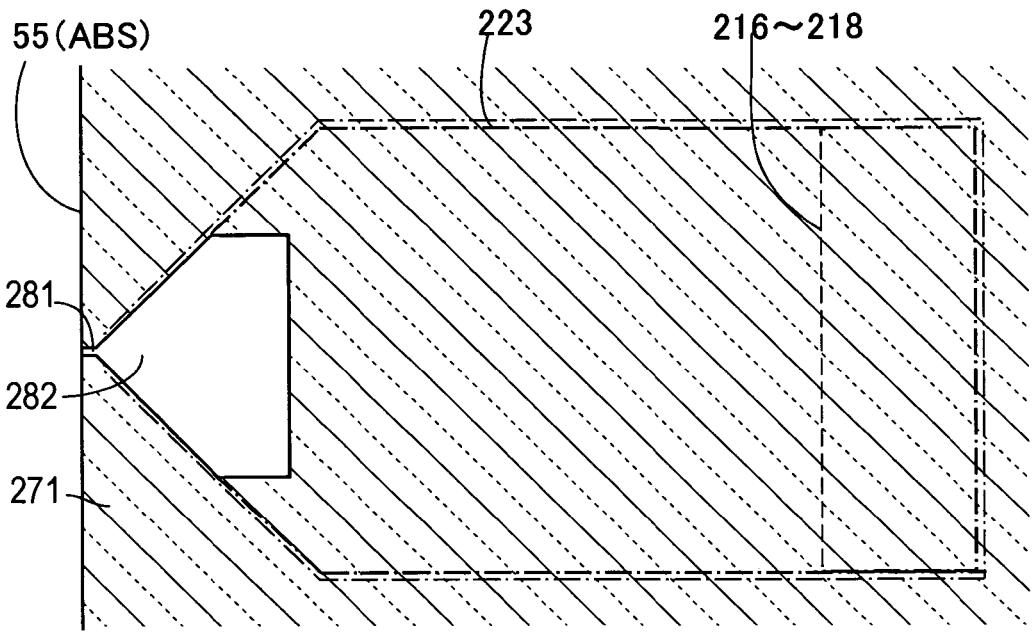
FIG. 5A is a diagram showing the arrangement of a trench portion in the thin-film magnetic head shown in FIGS. 3 and 4.
Figure 5B:
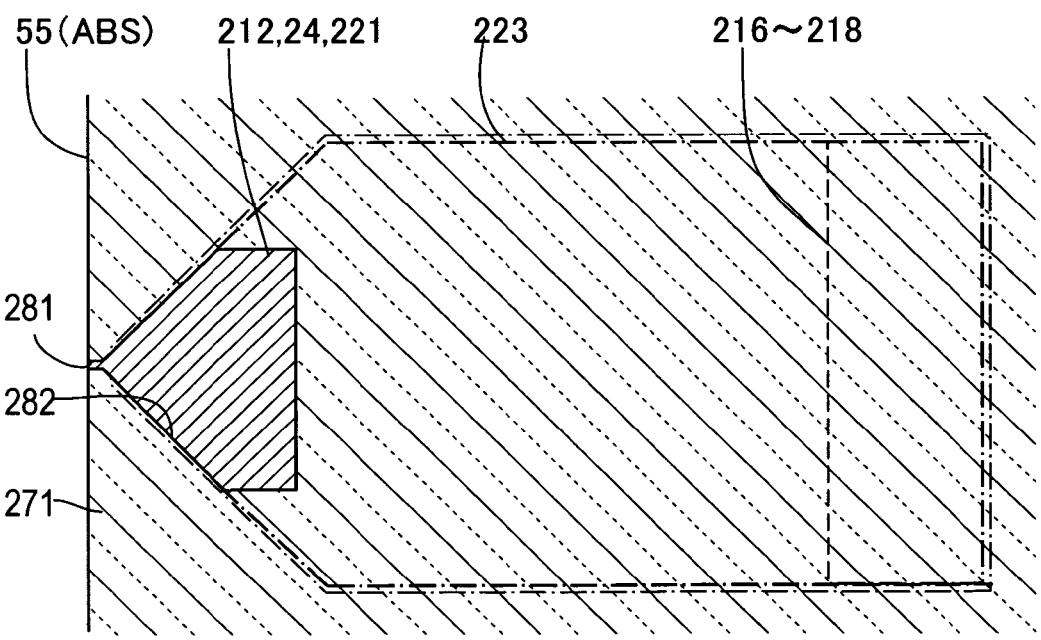
FIG. 5B is a diagram showing the arrangement of a lower pole film, a gap film and a first upper pole film in the trench portion shown in FIG. 5A.
Figure 5C:
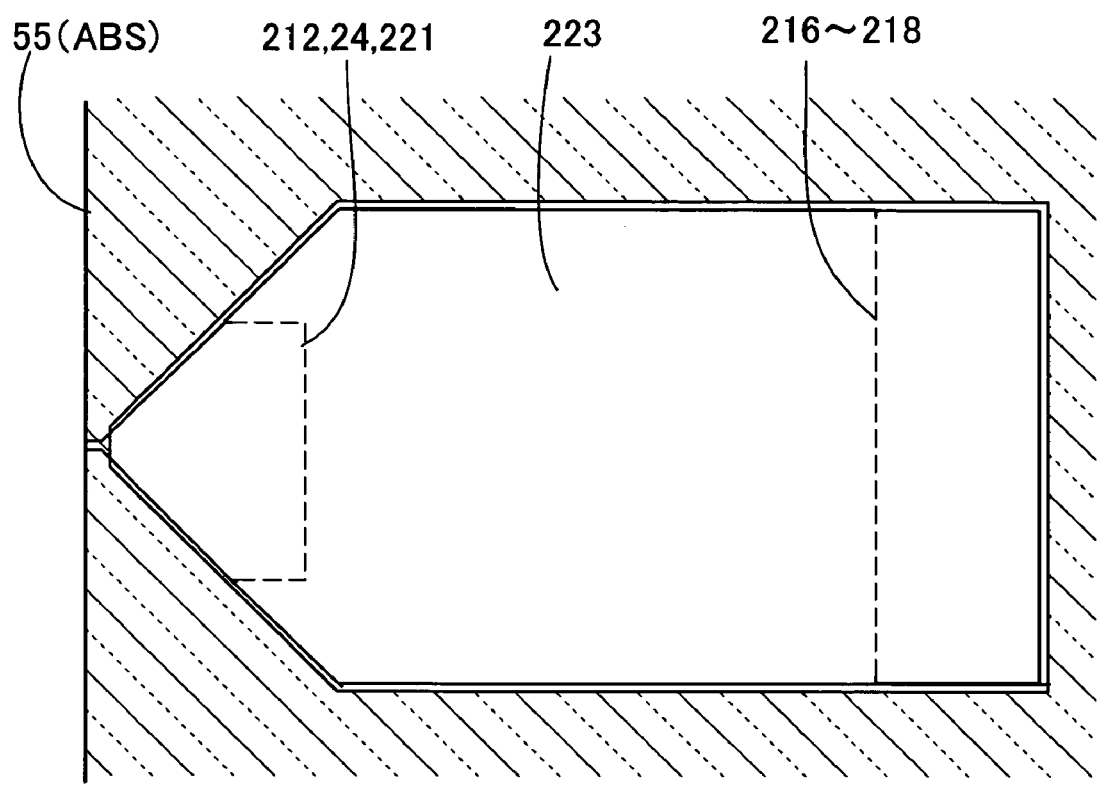
FIG. 5C is a diagram showing the state of arranging an upper yoke film relative to the arrangement of the lower pole film, the gap film and the first upper pole film shown in FIG. 5B.

In the above-described basic structure, at least end faces of the lower pole film 212, the gap film 24 and the first upper pole film 221, said end faces facing a recording medium, are located inside a trench portion (281, 282) provided in the inorganic insulating film 271. The structure of the trench portion (281, 282) and the arrangement relation of the lower pole film 212, the gap film 24 and the first upper pole film 221 inside the trench portion are shown in FIGS. 5A to 5C. Referring to these figures, first the trench portion (281, 282) comprises a narrow-width portion 281 and a wide-width portion 282 (see FIG. 5A). The narrow-width portion 281 is a portion which contains the magnetic pole end portion of the lower pole film 212, the gap film 24 and the magnetic pole end portion of the first upper pole film 221 (see FIG. 5B), and substantially determines the track width. The wide-width portion 282 is continuous to the rear of the narrow-width portion 281, and the lower pole film 212 is continuous in the narrow-width portion 281 and the wide-width portion 282. Therefore, a write magnetic flux can be concentrated from the wide-width portion 282 onto the narrow-width portion 281.

The second upper pole film 222 is provided on the first upper pole film 221, the third upper pole film 224 is provided on the second upper pole film 222, and the upper yoke film 223 is provided on the third upper pole film 224 (see FIG. 5C).

As described above, the lower pole film 212 of the write element is a plated film provided on one face of the lower yoke film 211, and is located inside the trench portion (281, 282) provided in the first inorganic insulating film 271. Therefore, the lower pole film 212 can be formed by plating inside a trench portion (281,282) using the lower yoke film 211 as a seed electrode. Due to this, a trim shoulder inevitably generated in case of using a technique of making the track width minute by means of IBE or RIE is not generated. Since no trim shoulder is generated, an ATE problem does not occur in a write operation onto a magnetic recording medium.

Inside the trench portion (281, 282), there are arranged not only the lower pole film 212 but also the gap film 24 and the upper pole film 221. Due to this, for the first upper pole film 221, it is possible to shorten the distance from the pole end face to the flare point and thereby improve the O/W characteristic and to sharpen the rise-up characteristic of a write magnetic flux and thereby increase the switching speed.

This point is described more concretely with reference to FIGS. 7 and 8. FIG. 7 is a plan view showing a part of a first upper pole film 221 of a conventional thin-film magnetic head obtained by acquiring a tentative track width by applying a photolithography process and a plating method and then adjusting the track width by means of a dry etching process such as RIE, IBE or the like, and FIG. 8 is a plan view showing a part of a first upper pole film 221 of a thin-film magnetic head according to the present invention.

The first upper pole film 221 is generally expanded in area at the rear, being seen from the medium facing surface (pole end face) 55 to be an ABS and has a flare point FP1 to be the starting point of expansion in area. The distance ΔNH1 from the medium facing surface 55 to the flare point FP1 must be set so as to be a constant value as short as possible. The reason is that shortening the distance ΔNH1 from the medium facing surface 55 to the flare point FP1 has a great influence on improving the O/W characteristic and increasing the switching speed by sharpening the rise-up characteristic of a write operation.

However, a conventional technique of acquiring a tentative track width by applying a photolithography process and a plating method and then adjusting the track width by means of RIE or IBE results in having a first upper pole film 221 gently varied in its end edges before and after a flare point FP1 to be primarily set. On the one hand, the track width of the first upper pole film 221 to come out in the medium facing surface 55 must be set at a specified stable dimension. Due to this, the distance ΔNH1 from the medium facing surface 55 to the flare point FP1 is made longer.

Further, since the end edges of the first upper pole film 221 varies gently before and after the flare point FP1, a definite flare point cannot be formed.

Due to this, the prior art results in having limits to the improvement in the O/W characteristic, the sharpening of the rise-up characteristic and the increase of the switching speed.

On the contrary, in a thin-film magnetic head according to the present invention, the distance ΔNH1 from the medium facing surface 55 to the flare point FP1 is determined by the narrow-width portion 281 of the trench portion (281, 282) formed by RIE or IBE. Due to this, in the first upper pole film 221, the distance ΔNH1 from the medium facing surface 55 to the flare point FP1 and the flare point FP1 can be set at a short and highly accurate value determined by the shape of the narrow-width portion 281. In the first upper pole film 221, therefore, it is possible to shorten the distance from the medium facing surface 55 to the flare point FP1 and thereby improve the O/W characteristic and to sharpen the rise-up characteristic of a write operation and thereby increase the switching speed.

Since a thin-film magnetic head according to the present invention determines the track width by means of the width of a narrow-width portion 281 forming a trench portion (281, 282), it is possible to exactly control the track width at a very high accuracy by controlling the width of the narrow-width portion. As its concrete structure, at least the narrow-width portion 281 out of the trench portion (281, 282) can be formed into a structure having an attached film 28 made of a non-magnetic material on the inner side faces of the trench portion. Due to this the magnetic pole end portion of the lower pole film 212 and the magnetic pole end portion of the first upper pole film 221 are made to have a track width reduced by the attached film 28.

The attached film 28 is preferably a CVD film using $Al_2O_3$ or the like, and particularly preferably a CVD film using an atomic layer method, concretely, an Al-CVD film of $Al_2O_3$. According to an atomic layer method, a film of 1 angstrom in thickness can be formed by one-shot gas jetting. Therefore, the width of a trench portion (281, 282) can be controlled in angstroms. This means that the track width determined by the width of a trench portion (281, 282) can be controlled substantially optionally with a high accuracy. In practice, the thickness of an Al-CVD film comes into a range of 5 to 50 nm.

Since a high-accuracy and super-fine process using a CVD film by means of an atomic layer method is also reflected directly in a flare point FP1 in an upper pole film 221, it is possible to control in angstroms the position of the flare point FP1 and the distance from the medium facing surface to the flare point FP1. As an example, according to the present invention, the distance from a flare point FP1 to a medium facing surface can be determined within a range of 0.1 to 0.5 µm.

The gap film 24 adjacent to the lower pole film 212 may be continuous in the narrow-width portion 281 and the wide-width portion 282, and may be provided only in the narrow-width portion 281.

Referring to FIGS. 3 to 6 again, a thin-film magnetic head according to the present invention has additionally a non-magnetic film 29 for determining a throat height at the rear of the lower pole film 212. Due to the existence of this non-magnetic film 29, it is possible to exactly determine the throat height, shorten the throat height and improve the magnetic recording characteristics. Although in the illustrated embodiment the non-magnetic film 29 is provided on the surface of the gap film 24, there may be formed a structure in which the non-magnetic film 29 is provided at the rear of the lower pole film 212 and on it the gap film 24 is provided. And the non-magnetic film 29 is formed out of a conductive metal film capable of being formed by a plating method, for example, out of NiPd, Ru or the like.

Embodiment 2 of a Thin-Film Magnetic Head

Figure 9:
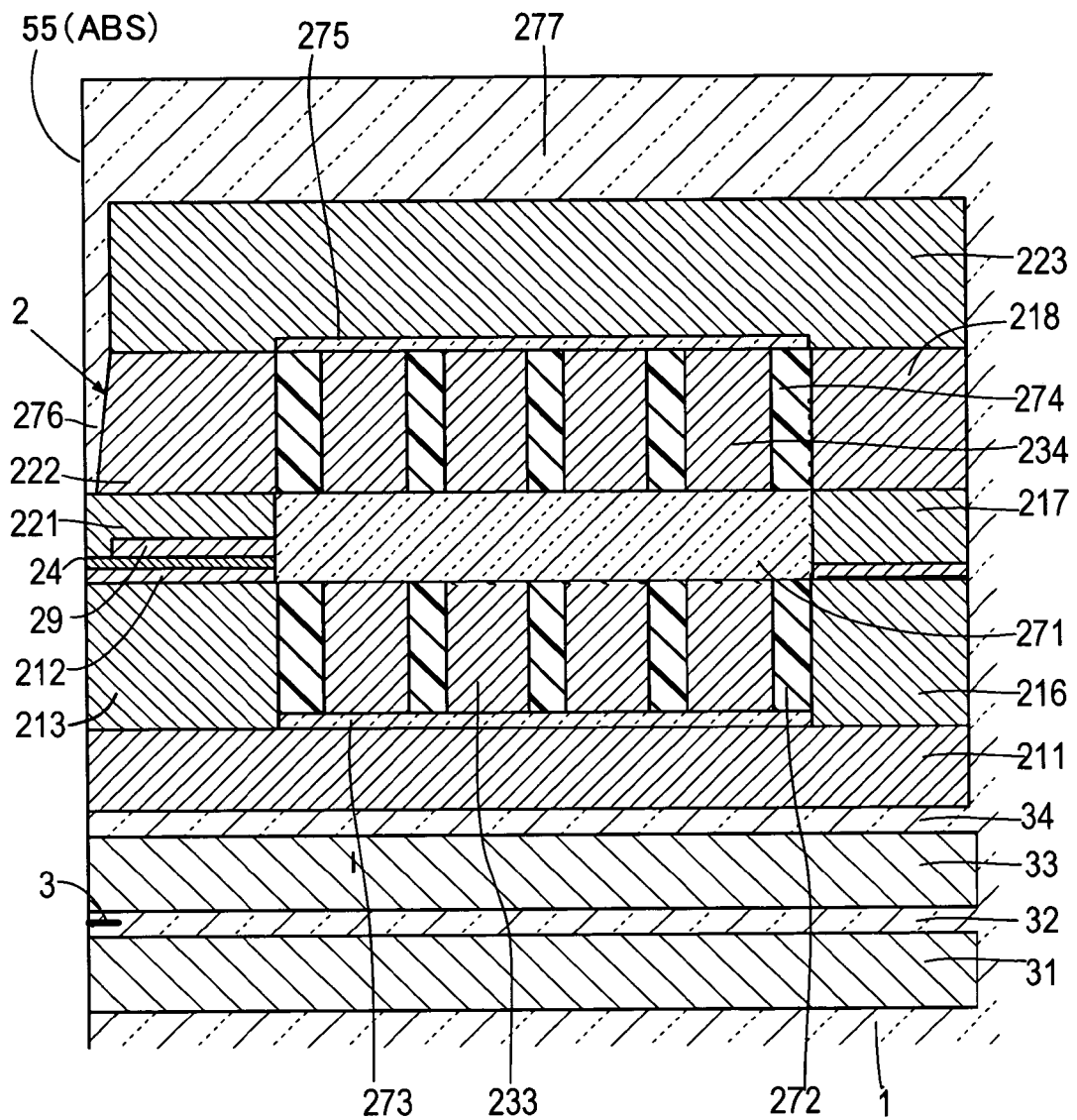
FIG. 9 is a magnified sectional view of a write element portion of another embodiment of a thin-film magnetic head according to the present invention.
Figure 10:
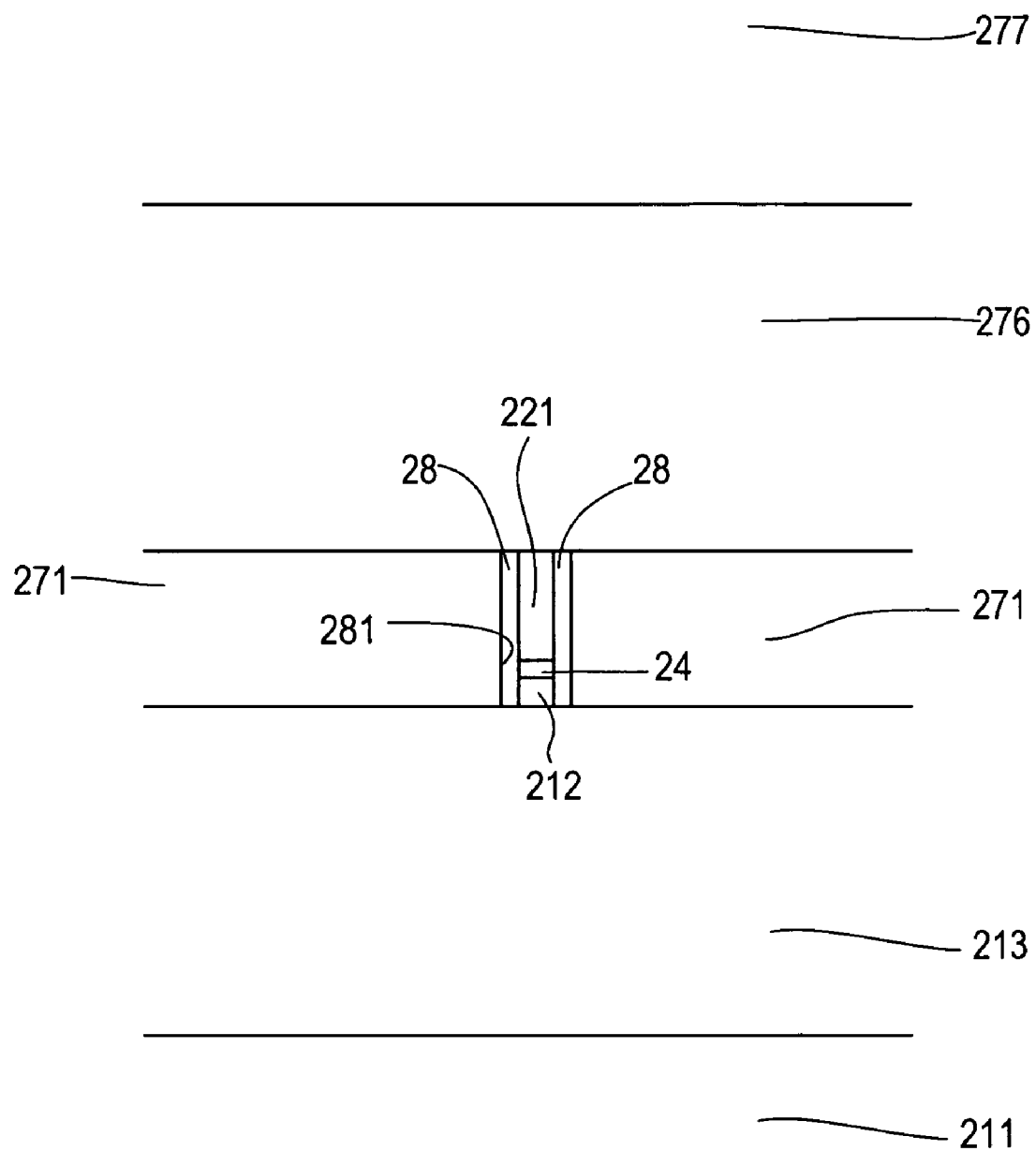
FIG. 10 is a magnified view of the write element portion shown in FIG. 9, seen from the medium facing surface side.
Figure 11:
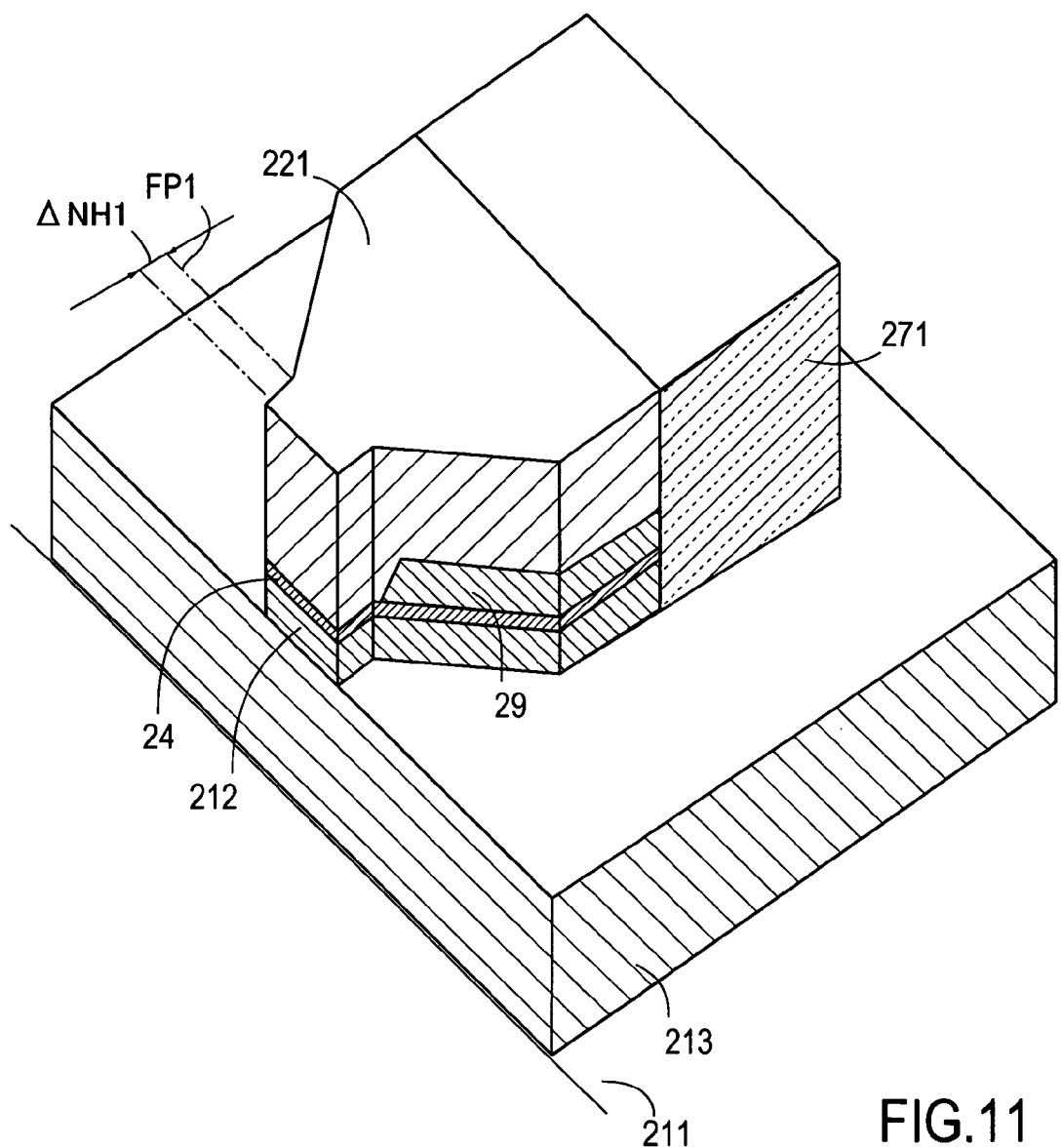
FIG. 11 is a perspective view showing the write element portion shown in FIGS. 9 and 10.

FIGS. 9 to 11 show another embodiment of a thin-film magnetic head according to the present invention. In the figures, components corresponding to the components shown in FIGS. 1 to 8 are given the same reference symbols. A thin-film magnetic head illustrated has also basically the same structure as the thin-film magnetic head shown in FIGS. 1 to 8 and performs an equivalent action. Mainly, characteristic matters are described in the following.

First, a second lower yoke film 213 is provided on a lower yoke film 211, and a first lower pole film 212 is provided on one face of the second lower yoke film 213. In short, the first lower pole film 212 is formed by a plating method using the second lower yoke film 213 as a seed electrode.

In a back gap portion, correspondingly to the above-mentioned second lower yoke film 213, a first back gap film 216 is provided and a first thin-film coil 233 is arranged between the second lower yoke film 213 and the first back gap film 216. The first thin-film coil 233 is arranged on the surface of a third insulating film 273 formed on the surface of the lower yoke film 211 and goes round the first back gap film 216. The periphery of the first thin-film coil 233 is filled up with a second insulating film 272. The second insulating film 272 is formed out of an organic insulating material. The first thin-film coil 233 and the second insulating film 272 are flattened in surface by CMP together with the second lower yoke film 213 and the second back gap film 217 located at both sides of them. A first insulating film 271 is formed on the flattened face formed by the surfaces of the first thin-film coil 233 and the second insulating film 272.

The first insulating film 271 is a part for forming a trench portion (281, 282) and the magnetic pole end portion of the lower pole film 212, the gap film 24 and the magnetic pole end portion of the first upper pole film 221 are arranged on the narrow-width portion 281 of the trench portion (281, 282).

The surfaces of the first upper pole film 221, the first insulating film 271, the second insulating film 272 and the first back gap film 216 are flattened by CMP. A second upper pole film 222 is arranged on the flattened face of the first upper pole film 221, and a second thin-film coil 234 is arranged on the flattened face of the first insulating film 271. The periphery of the second thin-film coil 234 is filled up with a fourth insulating film 274 made of an organic insulating material.

The second thin-film coil 234 and the fourth insulating film 274 are flattened in surface by CMP together with a third upper pole film 224 and a third back gap film 218 located at both sides of them. A fifth insulating film 275 is formed on the flattened face formed by the surfaces of the second thin-film coil 234 and the fourth insulating film 274. Further, a sixth insulating film 276 is arranged outside the third upper pole film 224 and the third back gap film 218.

The upper yoke film 223 is connected at both ends of it to the second upper pole film 222 and the third back gap film 218. The upper yoke film 223 is provided on the fifth insulating film 275 covering the surface of the flattened second thin-film coil 234, and is insulated from the second thin-film coil 234 by the fifth insulating film 275.

The lower pole film 212, the gap film 24 and the first upper pole film 221 are formed inside the trench portion (281, 282) by a plating method using the second lower yoke film 213 as a seed electrode. And an attached film 28 made of an Al-CVD film is attached onto the inner side faces of the trench portion (281, 282), and thereby the track width is controlled. Therefore, this embodiment also provides the actions and effects as described with reference to FIGS. 1 to 8.

Embodiment 3 of a Thin-Film Magnetic Head

Figure 12:
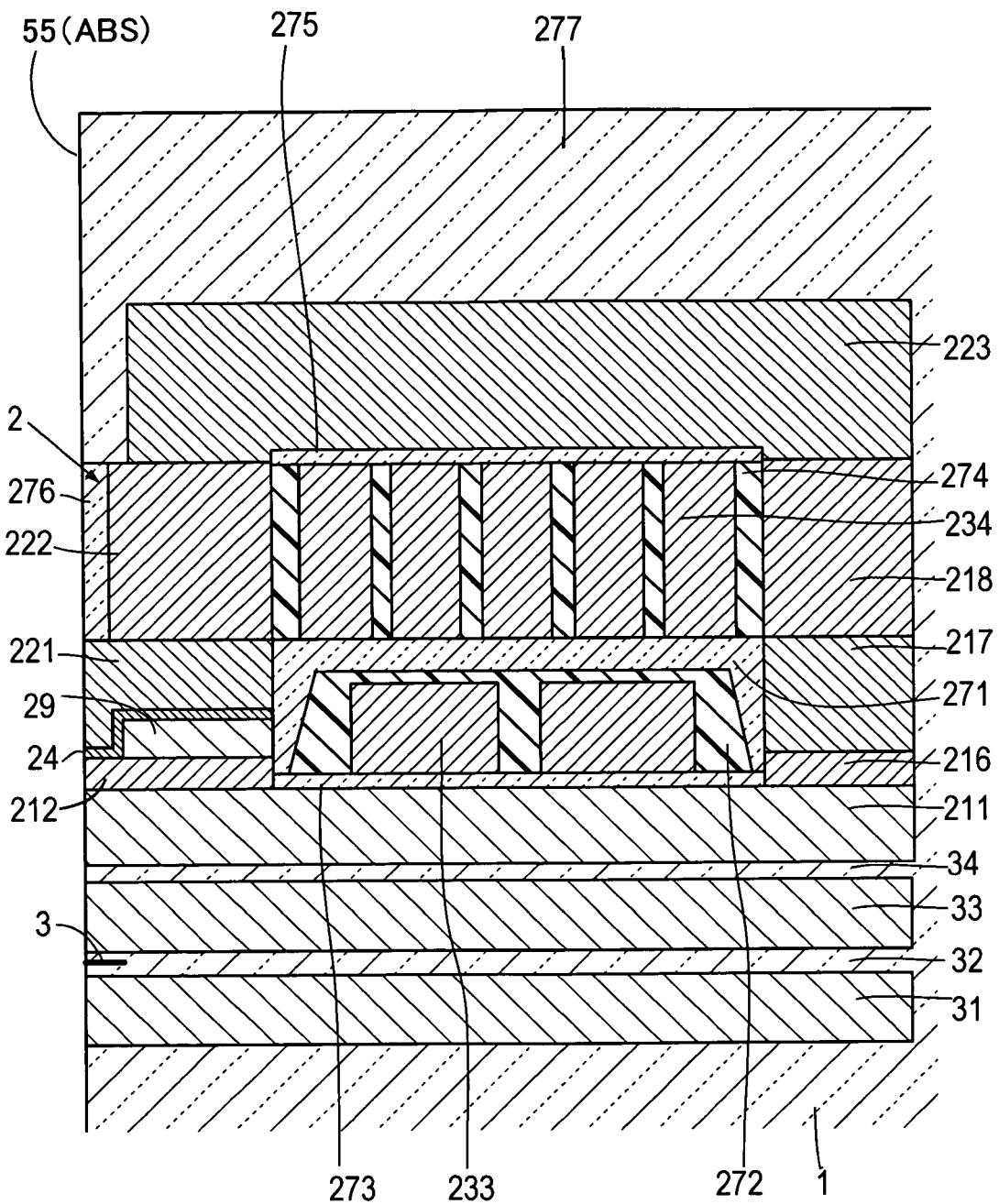
FIG. 12 is a magnified sectional view of a write element portion in another embodiment of a thin-film magnetic head according to the present invention.
Figure 13:
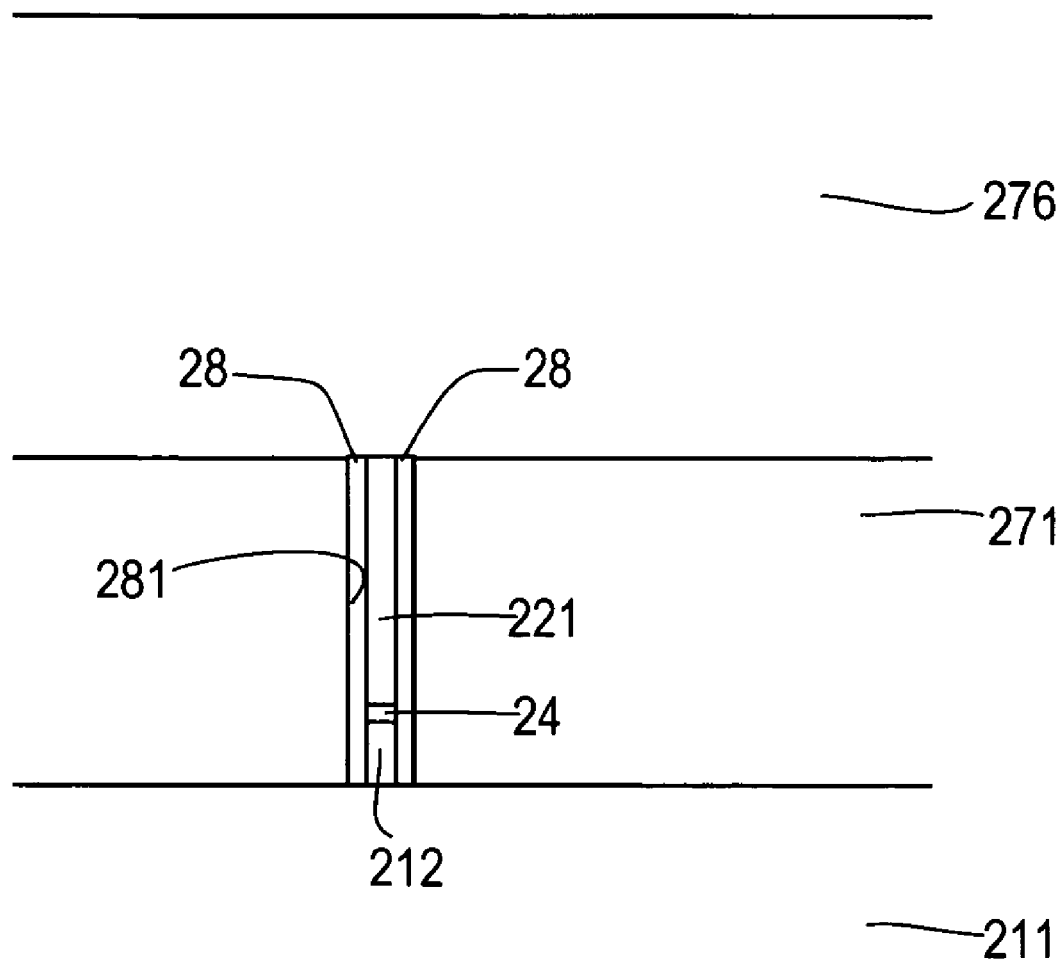
FIG. 13 is a magnified view of the write element portion shown in FIG. 12, seen from the medium facing surface side.
Figure 14:
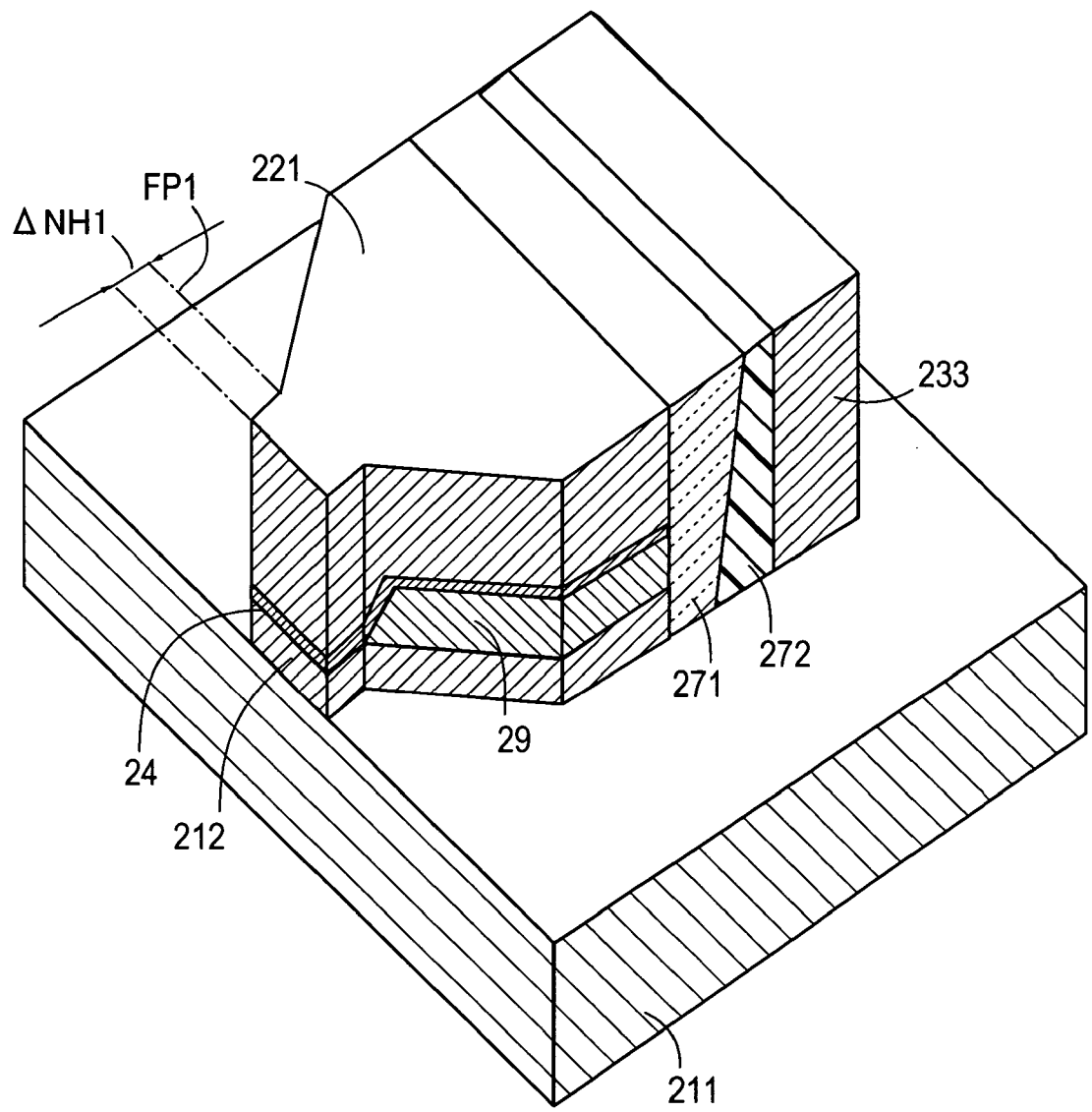
FIG. 14 is a perspective view showing the write element portion shown in FIGS. 12 and 13.

FIGS. 12 to 14 show another embodiment of a thin-film magnetic head according to the present invention. Components corresponding to the components shown in FIGS. 1 to 8 are given the same reference symbols. A thin-film magnetic head illustrated has also fundamentally the same structure as the thin-film magnetic head shown in FIGS. 1 to 8. Describing mainly characteristic matters of this embodiment, first a non-magnetic film 29 for determining a throat height is attached onto a gap film 24. Such a structure can also provide actions and effects equal to the structure shown in FIGS. 1 to 8, namely, the case of providing a non-magnetic film 29 for determining a throat height on a gap film 24.

Next, a first insulating film 271 is provided around an organic-based second insulating film 272 covering a first thin-film coil 233, and a trench portion (281, 282) is provided in this first insulating film 271.

In this embodiment also, a lower pole film 212, a gap film 24 and a first upper pole film 221 are formed inside the trench portion (281, 282) by a plating method using a lower yoke film 211 as a seed electrode. And an attached film 28 is attached onto the inner side faces of the trench portion (281, 282), and thereby the track width is controlled. Therefore, this embodiment also provides actions and effects as described with reference to FIGS. 1 to 8.

And since the sectional area of a first thin-film coil 233 is made larger than a second thin-film coil 234, the heat generated in the first thin-film coil 233 can be reduced.

2. Method for Manufacturing a Thin-Film Magnetic Head

Embodiment 1 of a Manufacturing Method

Embodiment 1 of a manufacturing method is shown in FIGS. 15 to 32. This manufacturing method is directed to manufacturing the thin-film magnetic head shown in FIGS. 1 to 8. It is noticed in advance that processes shown in FIGS. 15 to 32 are performed on a wafer.

Figure 15:
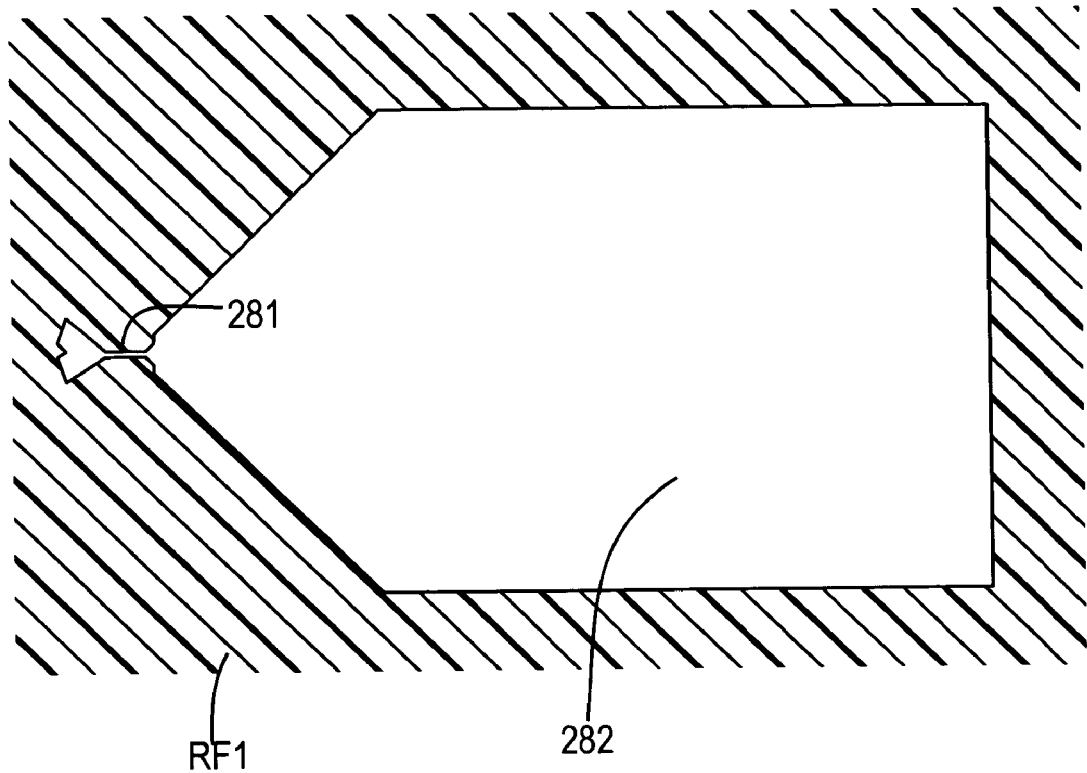
FIGS. 15 to 35 are diagrams showing a method of manufacturing a thin-film magnetic head having a write element shown in FIGS. 3 to 8.
Figure 16:
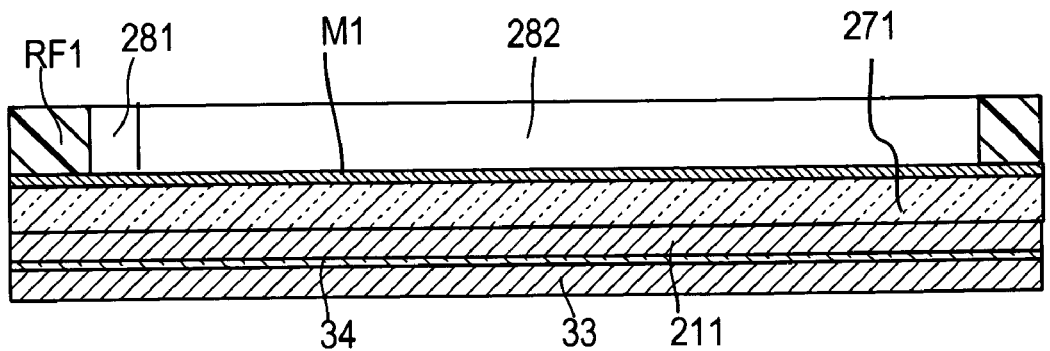

In the state of FIG. 15, a lower shield film 31, an insulating film 32, a read element 3, a second shield film 33, an insulating film 34 and a lower yoke film 211 have been already formed by well known processes. And a first insulating film 271 and a protective film M1 made of metal are formed on the surface of the lower yoke film 211, and further on it a resist frame RF1 for forming a trench portion is formed. The insulating film 271 is a sputtered film of $Al_2O_3$.

Figure 17:
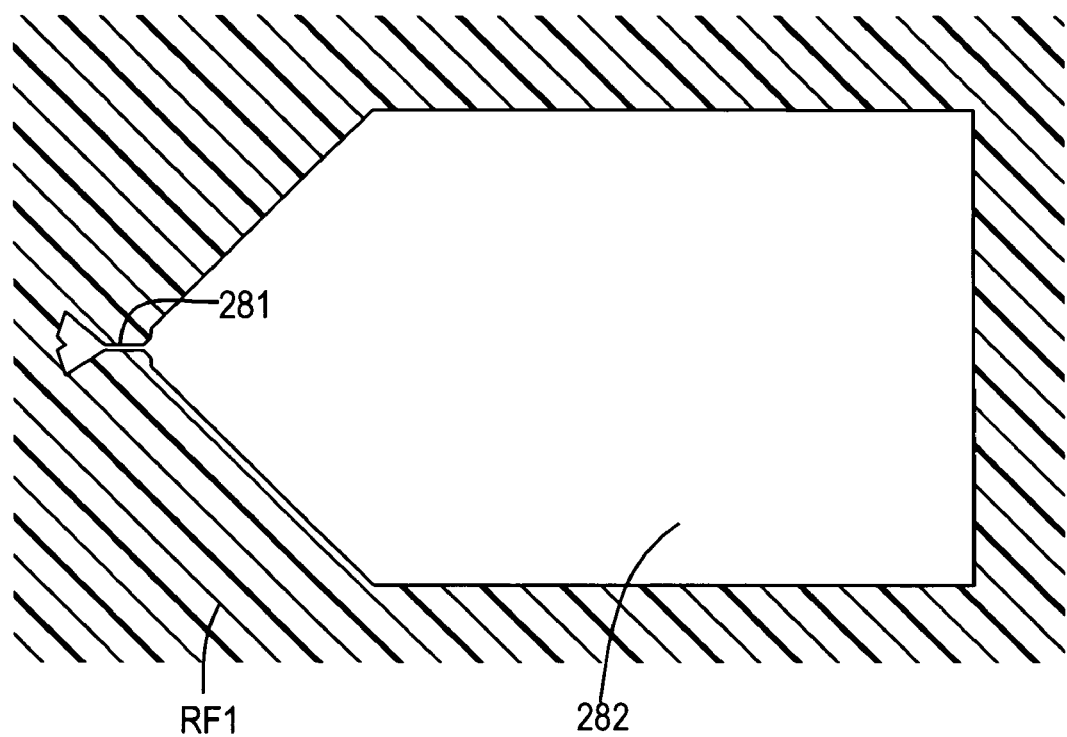
Figure 18:
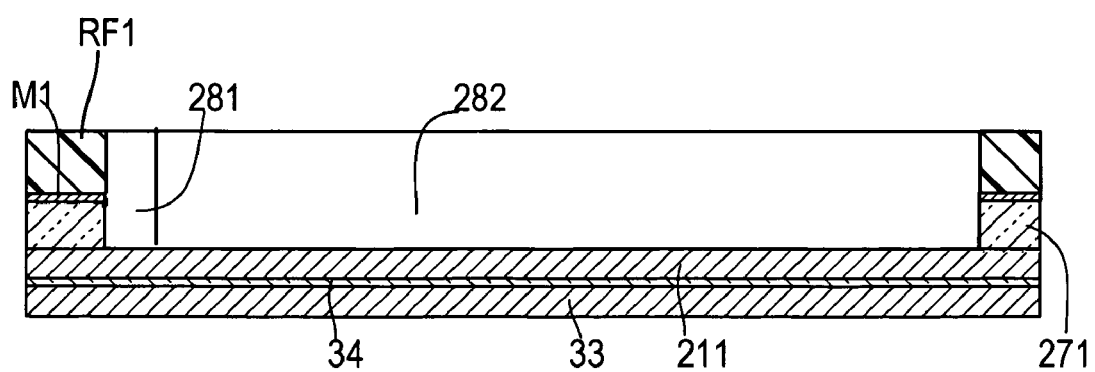
Figure 19:
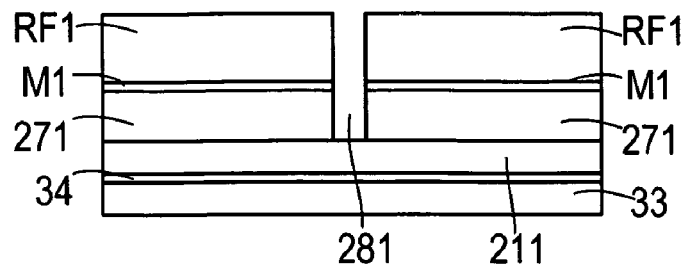

Next, in processes shown in FIGS. 17 to 19, a trench portion (281, 282) is formed at a position corresponding to a pole portion by means of a dry etching method such as IBE, RIE or the like in the first insulating film 271. The trench portion (281, 282) has a narrow-width portion 281 and a wide-width portion 282. The protective film M1 and the resist frame RF1 used for patterning are left on the surface of the first insulating film 271.

Figure 20:
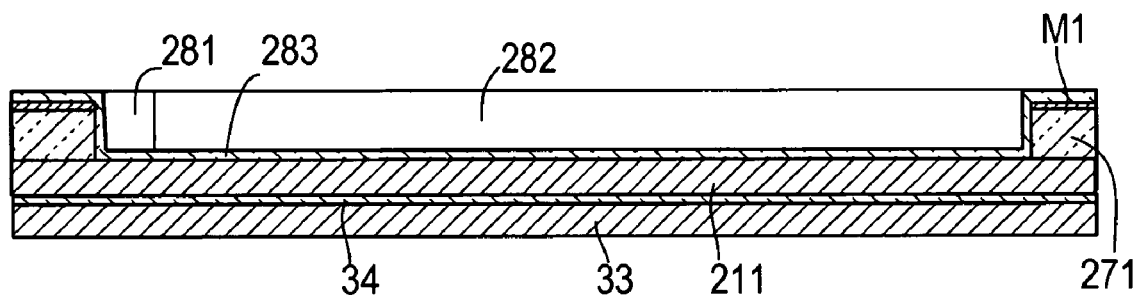
Figure 21:
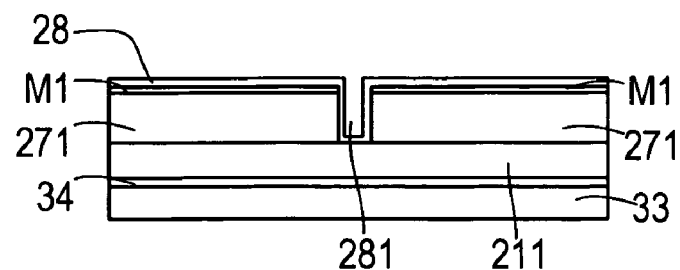

Next, after the resist frame RF1 is removed by a well known means, as shown in FIGS. 20 and 21, an attached film 28 is formed on the inner side faces of the trench portion (281, 282), the protective film M1 on the first insulating film 271 and the surface of the lower yoke film 211. The attached film 28 is a CVD film using an atomic layer method, concretely, an Al-CVD film of $Al_2O_3$.

According to Al-CVD using an atomic layer method, a film of 1 angstrom in thickness can be formed by one-shot gas jetting. Therefore, the width of the narrow-width portion 281 directly participating in determining the track width out of the trench portion (281, 282) can be controlled in angstroms. This means that the track width determined by the width of the narrow-width portion 281 can be controlled substantially optionally with a high accuracy. In practice, the thickness of an Al-CVD film comes into a range of 5 to 50 nm.

Figure 22:
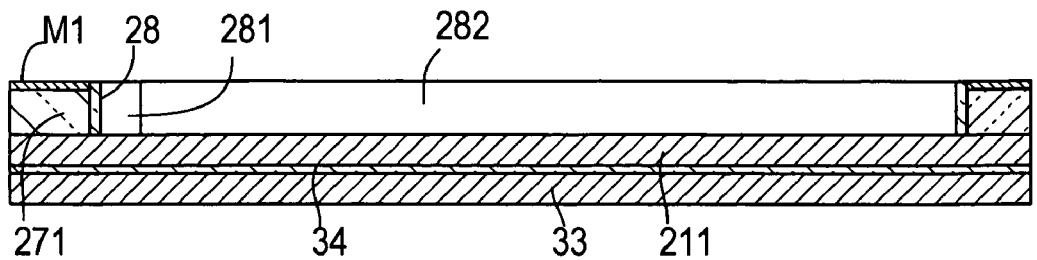
Figure 23:
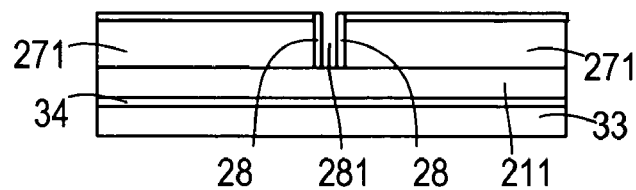

Next, as shown in FIGS. 22 and 23, the attached film 28 attached to the inner side faces of the trench portion (281, 282) is left and the attached film 28 existing on the bottom of the trench portion (281, 282) is removed by a dry etching process.

Figure 24:
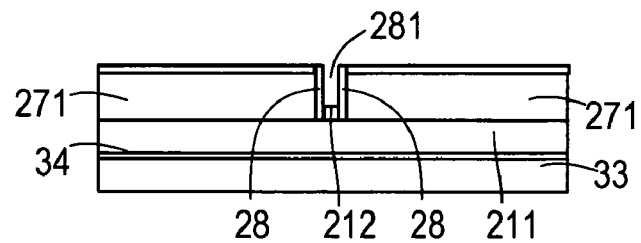
Figure 25:
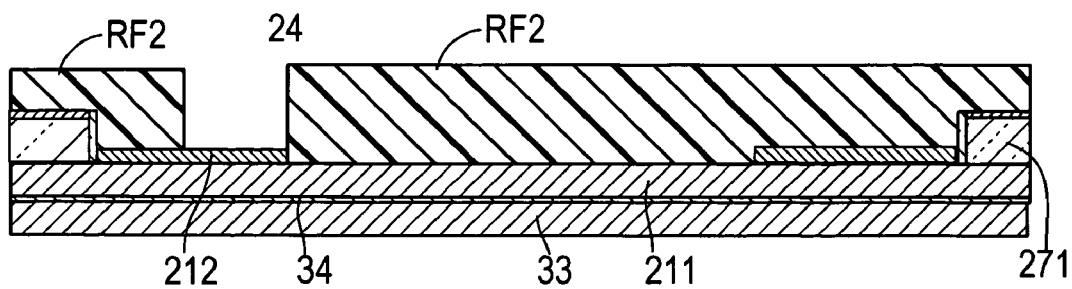
Figure 26:
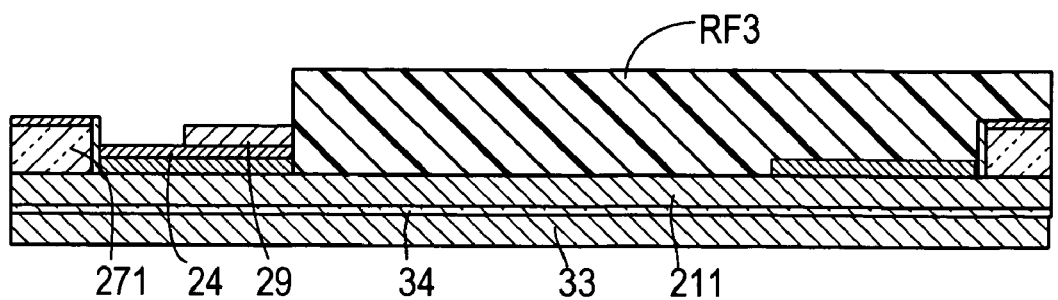
Figure 27:
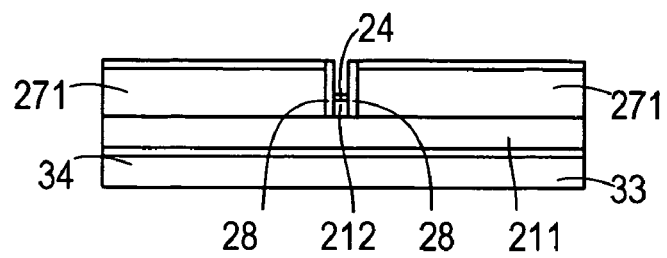

Next, as shown in FIGS. 24 and 25, a lower pole film 212 is attached by a plating process using the lower yoke film 211 as a seed electrode. Since the lower yoke film 211 is exposed in the inner bottom face of the trench portion (281, 282), a plating process described above is possible. The lower pole film 212 can be formed as a plated film of NiFe (80%:20%), NiFe (45%:55%) or CoNiFe (23 kG, 21 kG).

Hereupon, the attached film 28 is a CVD film using an atomic layer method, concretely an Al-CVD film of $Al_2O_3$. According to Al-CVD using an atomic layer method, a film of 1 angstrom in thickness can be formed by one-shot gas jetting. Therefore, the width of the narrow-width portion 281 directly participating in determining the track width out of the trench portion (281, 282) can be controlled in angstroms. This means that the track width determined by the width of the narrow-width portion 281 can be controlled substantially optionally with a high accuracy.

After the lower pole film 212 has been formed as described above, as shown in FIGS. 25 to 27 a gap film 24 and a non-magnetic film 29 are formed by a plating method into a pattern determined by the resist frame RF2. Since the gap film 24 is formed by plating, a non-magnetic conductive material such as Ru, NiCu, Ta or the like is used. A non-magnetic film 29 for determining a throat height is also formed out of a non-magnetic metal film having conductivity.

Figure 28:
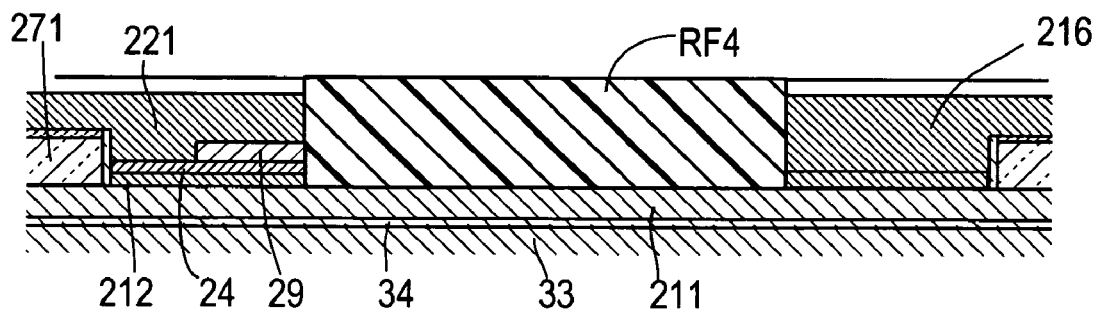
Figure 29:
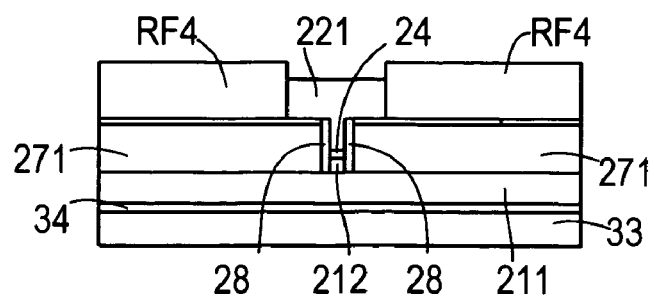

Next, as shown in FIGS. 28 and 29, an opening for exposing the gap film 24 and an opening for exposing the lower yoke film 211 in an area corresponding to a back gap area at the rear are formed using a resist frame RF4, and a first upper pole film 221 and a first back gap film 216 are formed by plating. Similarly to the lower pole film 212, the first upper pole film 221 can be also as a plated film of NiFe (80%:20%), NiFe (45%:55%) or CoNiFe (23 kG, 21 kG).

The first upper pole film 221 also results in being formed inside the narrow-width portion 281 set with a super-high accuracy and further at a very narrow value by the attached film 28. Due to this, the track width is controlled in angstroms and a pole structure having a track width so narrow as not to be realizable at all by the prior art results in being obtained.

Moreover, since a high-accuracy and super-fine process using an attached film 28 is also reflected directly in defining a flare point, it is possible to set the distance from the medium facing surface to the flare point at a short value with a high accuracy determined in angstroms at the first upper pole film 221 (see FIG. 8).

Figure 30:
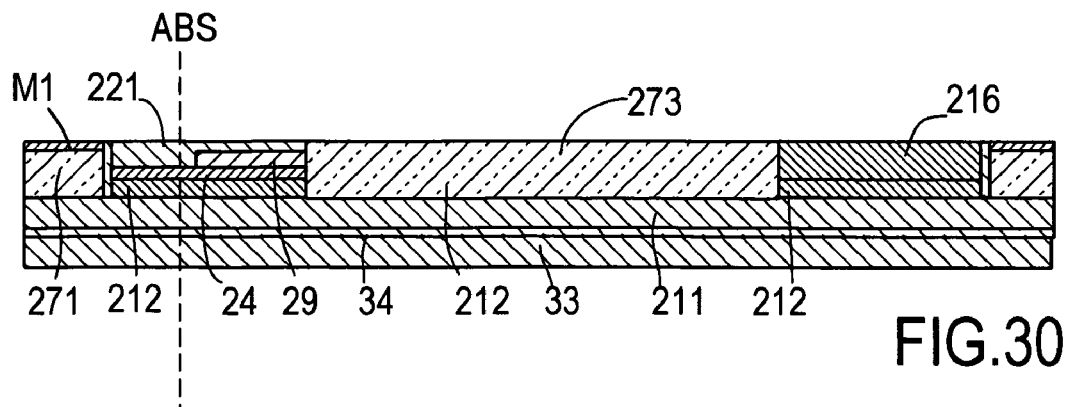
Figure 31:
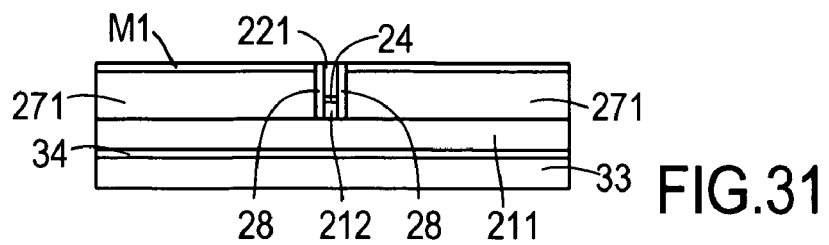

Next, the resist frame RF4 is removed, and a first insulating film 271 made of an inorganic material, such as $Al_2O_3$ or the like is formed for example by sputtering or the like in the area left after removal of the resist frame RF4 and then the surface of it is flattened by applying CMP. By this, as shown in FIGS. 30 and 31, there is obtained a structure in which the surfaces of the first insulating film 271, the first upper pole film 221 and the first back gap film 216 are flattened so as to be fitted to the surface of the protective film M1.

Figure 32:
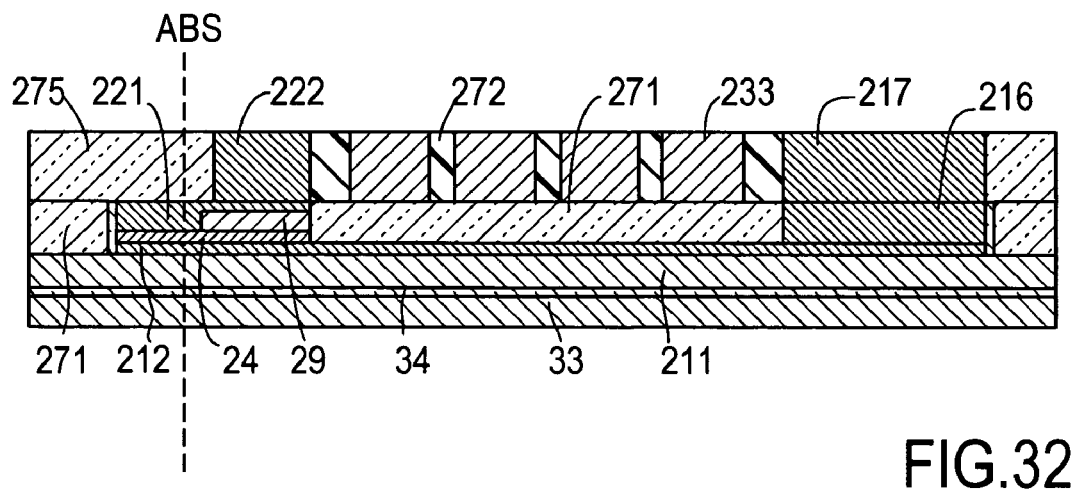
Figure 33:
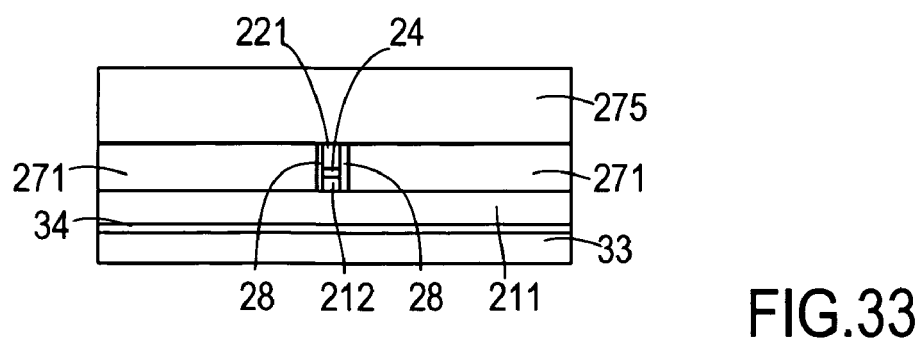

Next, as shown in FIGS. 32 and 33, a fifth insulating film 275, a second upper pole film 222, a first thin-film coil 233, a second insulating film 272 and a second back gap film 217 are formed on the flattened surface, and their surfaces are flattened by applying CMP. The second upper pole film 222 is formed adjacently to the first upper pole film 221 by plating. The second back gap film 217 is formed adjacently to the first back gap film 216 by plating. The first thin-film coil 233 is also formed by plating, and the periphery of it is filled up with a second organic insulating film 272.

Figure 34:
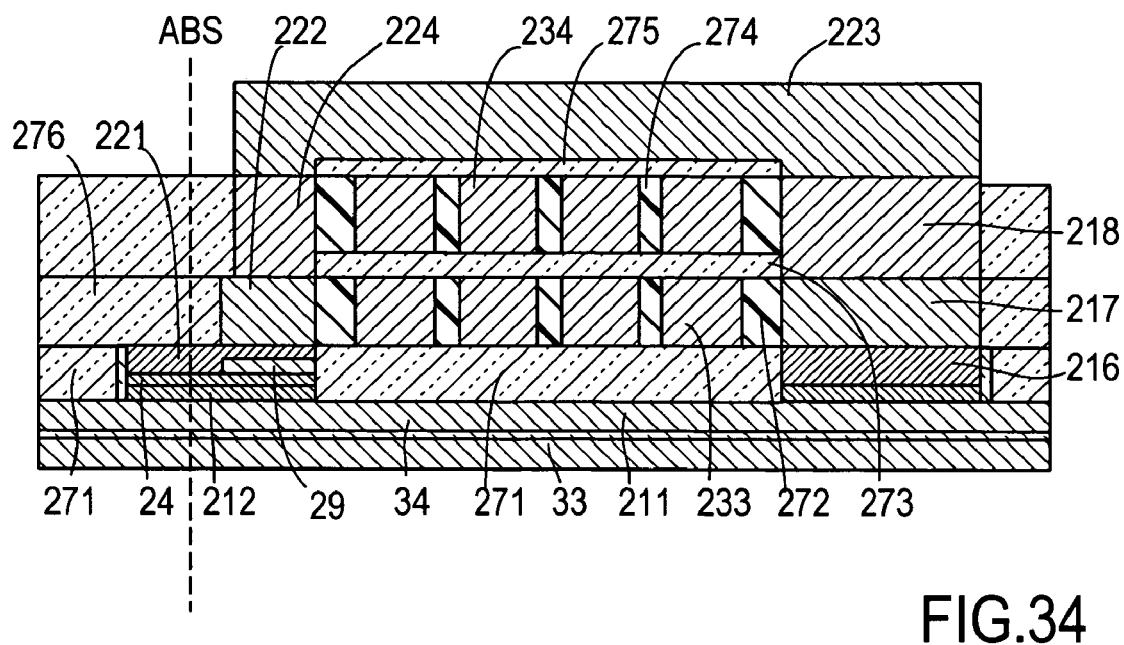
Figure 35:
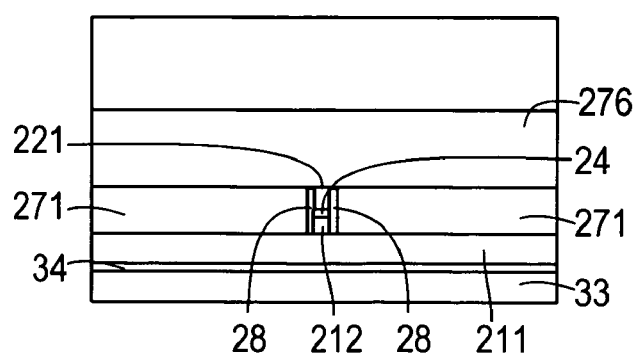

Next, as shown in FIGS. 34 and 35, a third upper pole film 224, a third back gap film 218, a second thin-film coil 234, a third insulating film 273, a fourth insulating film 274 and a sixth insulating film 276 are formed according to ordinary processes, and further an upper yoke film 223 for magnetically connecting the upper pole film 224 with the third back gap film 218 is formed on the surface of the fifth insulating film 275. The upper yoke film 223 is formed as a pattern-plated film of NiFe, CoNiFe or the like. After this, an insulating film 277 for protection is formed by sputtering or the like. By this, a thin-film magnetic head shown in FIGS. 1 to 8 is obtained.

Embodiment 2 of a Manufacturing Method

Embodiment 2 of a manufacturing method is shown in FIGS. 36 to 54. This manufacturing method is directed to manufacturing the thin-film magnetic head shown in FIGS. 9 to 11.

Figure 36:
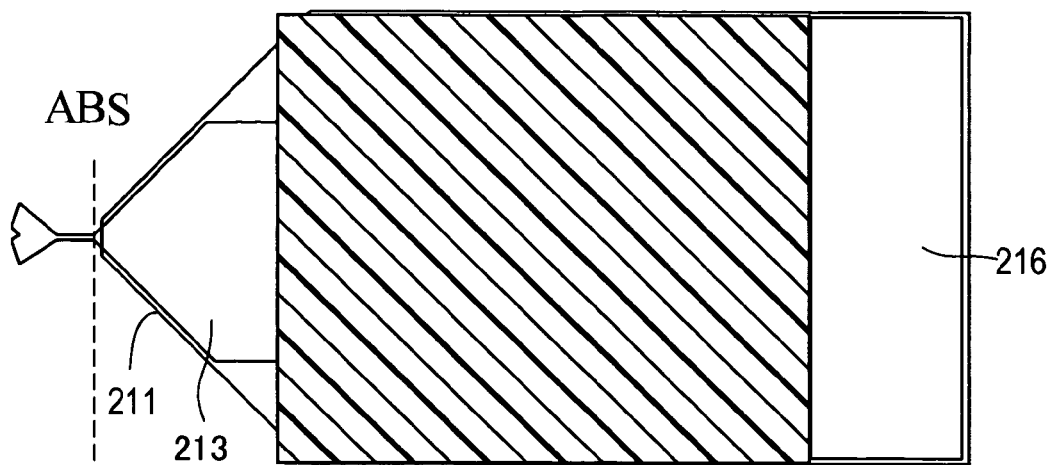
FIGS. 36 to 54 are diagrams showing a method of manufacturing a thin-film magnetic head having the write element shown in FIGS. 9 to 11.
Figure 37:
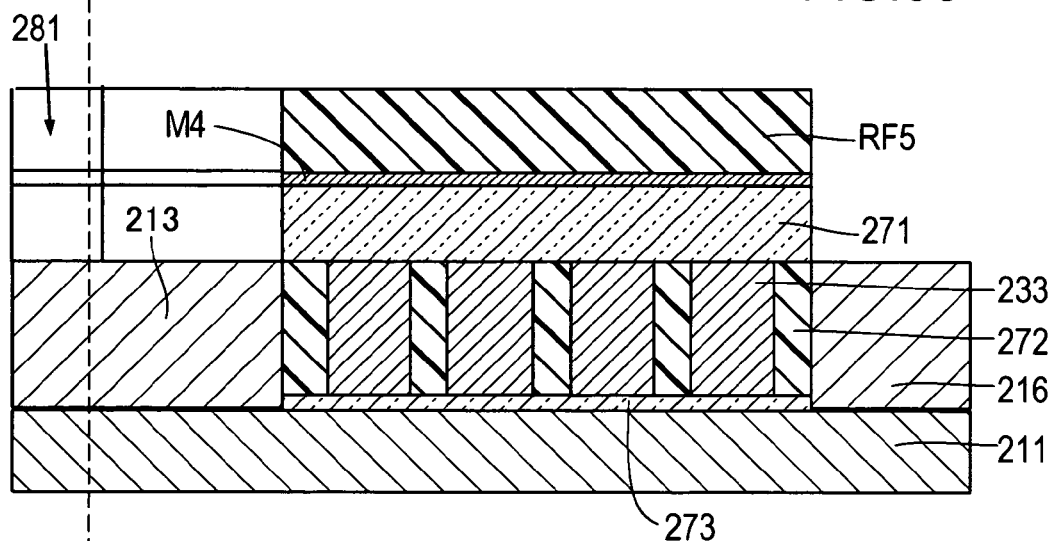
Figure 38:
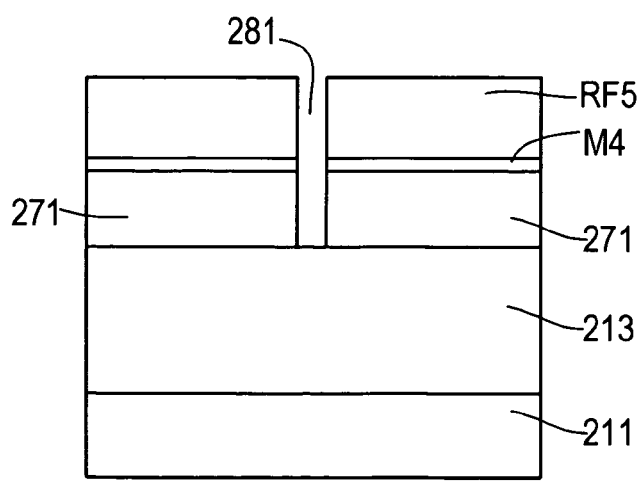

First, referring to FIGS. 36 to 38, a second lower yoke film 213, a first back gap film 216, a first thin-film coil 233 and a first insulating film 271 have been already formed on a lower yoke film 211, and a trench portion (281, 282) has been already formed on the first insulating film 271 by applying an ion milling process or an RIE process. The first thin-film coil 233 is electrically insulated from the lower yoke film 211 by a third insulating film 273, and further the periphery of it is filled up with a second insulating film 272 made of an organic insulating material. The surfaces of the second lower yoke film 213, the first back gap film 216, the first thin-film coil 233 and the second insulating film 272 have been flattened by means of CMP or the like, and the first insulating film 271 has been deposited onto the surfaces of them. A protective film M4 and a resist frame RF5 used for forming the trench portion (281, 282) have been attached onto the surface of the first insulating film 271.

Figure 39:
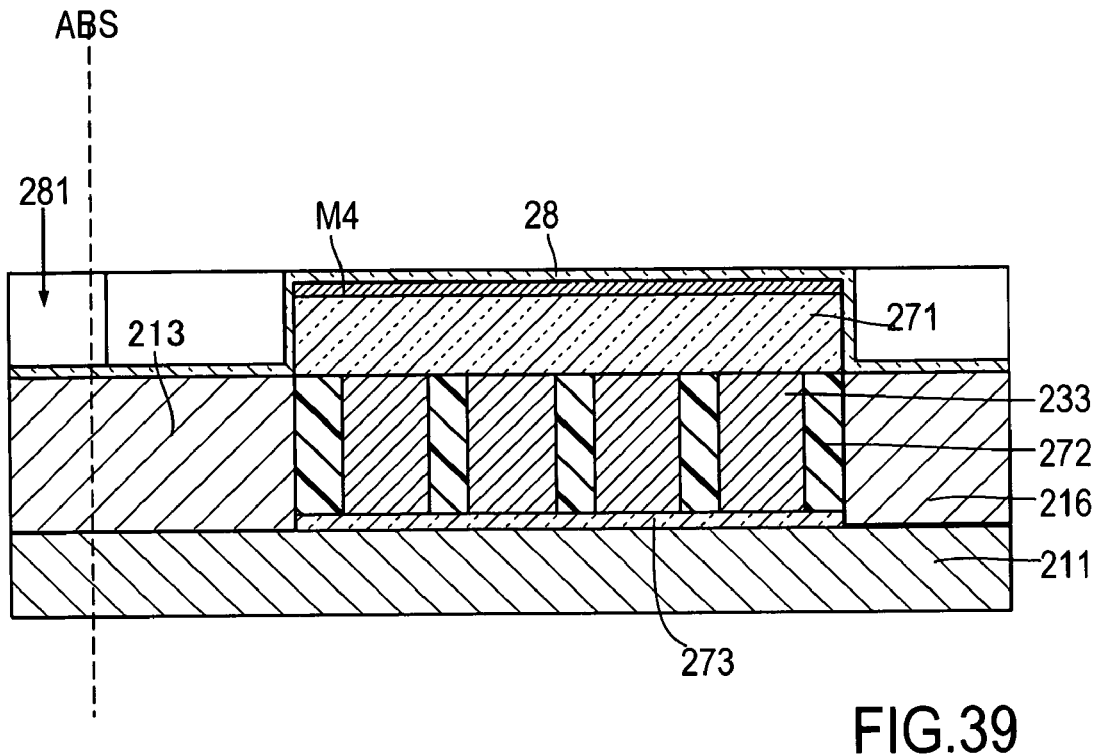
Figure 40:
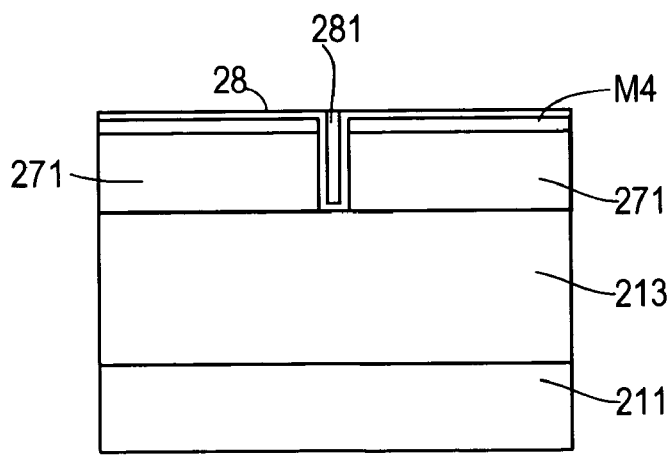

Next, after the resist frame RF5 is removed by a well known means, as shown in FIGS. 39 and 40 an attached film 28 made of an Al-CVD film formed by an atomic layer method with $Al_2O_3$ is formed on the inner side faces of the trench portion (281, 282), on the protective film M4 over the first insulating film 271, on the surface of the second lower yoke film 213 and on the surface of the first back gap film 216. By this, an attached film 28 having a super-fine film thickness with a super-high accuracy is formed.

Therefore, the track width of the trench portion (281, 282) is set at a very narrow value with a super-high accuracy. Due to this, a thin-film magnetic head having a track width so narrow as not to be realizable at all by the prior art, said track width being controlled in angstroms, results in being obtained.

Next, the attached film 28 attached to the inner side faces of the trench portion (281, 282) is left and the attached film 28 being existing on the bottom is removed by a dry etching process and thereby the surface of the lower yoke film 211 is exposed in the bottom.

Figure 41:
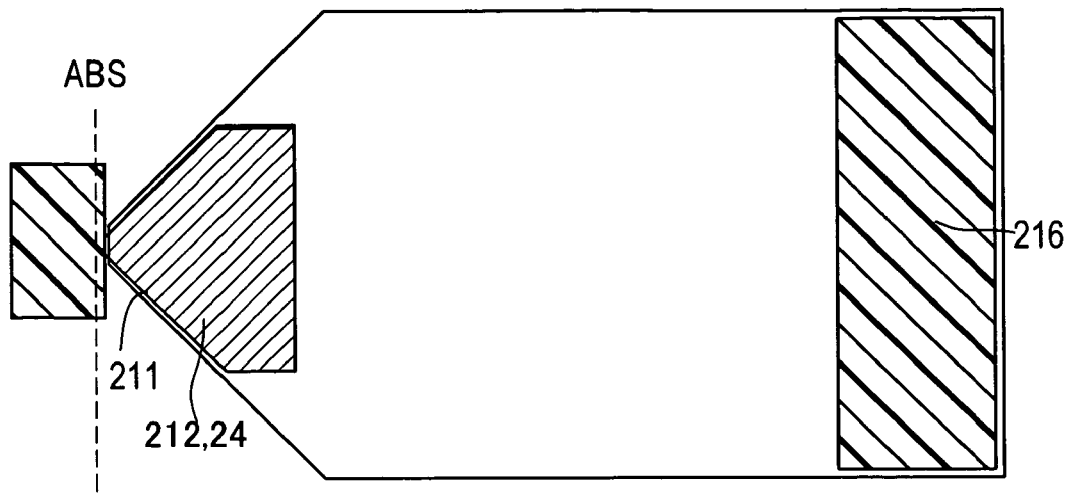
Figure 42:
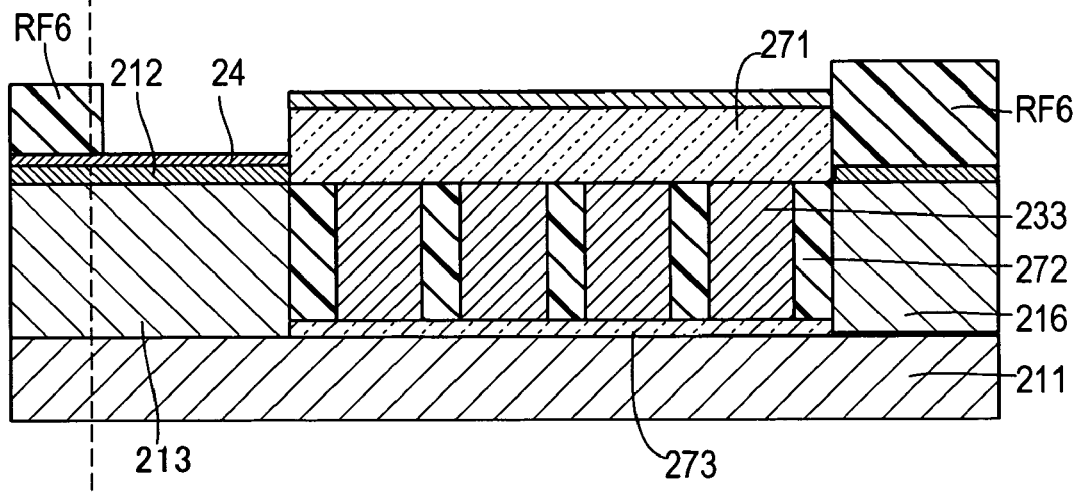
Figure 43:
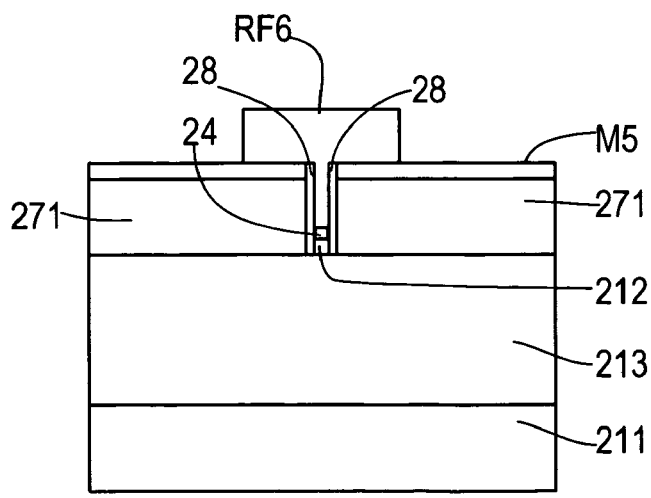

Next, as shown in FIGS. 41 to 43, a lower pole film 212 is formed by performing a plating method using the lower yoke film 211 and the second lower yoke film 213 as a seed electrode. Since the lower yoke film 211 is exposed in the inner bottom face out of the inner faces of the trench portion (281, 282), a plating process described above is possible. The lower pole film 212 can be formed as a plated film of NiFe (80%:20%), NiFe (45%:55%) or CoNiFe (23 kG, 21 kG).

Hereupon, since the attached film 28 is formed as an Al-CVD film by an atomic layer method, the narrow-width portion 281 directly participating in determining the track width out of the trench portion (281, 282) results in being controlled in angstroms and a lower pole film 212 having a track width so narrow as not to be realizable at all by the prior art results in being obtained. Since the attached film 28 can be set within a range of 5 to 50 nm in thickness, the track width of the lower pole film 212 can be controlled finely within this range.

In FIGS. 41 to 43, after the lower pole film 212 and the gap film 24 are formed by plating, a resist frame RF6 is formed and a non-magnetic film 29 for determining a throat height is formed by applying a plating method at a specified position defined by the resist frame RF6. The non-magnetic film 29 is formed out of a non-magnetic metal film having conductivity. FIGS. 41 to 43 show a state where the non-magnetic film 29 has been formed. Since the gap film 24 is formed by plating, a non-magnetic conductive material of Ru, NiCu, Ta or the like is used. The gap film 24 also results in being formed inside the trench portion (281, 282) set at a very narrow value with a super-high accuracy by the attached film 28.

Figure 44:
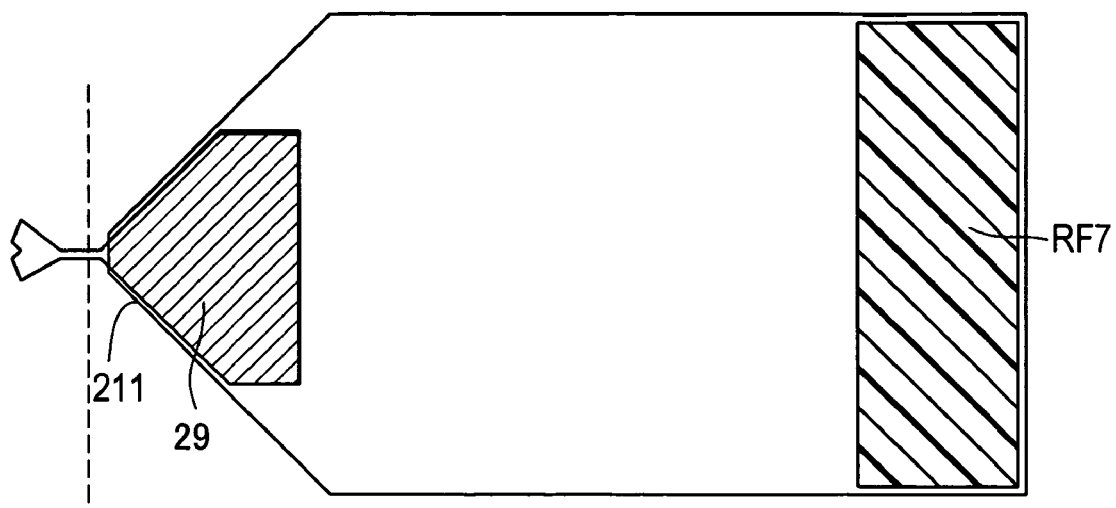
Figure 45:
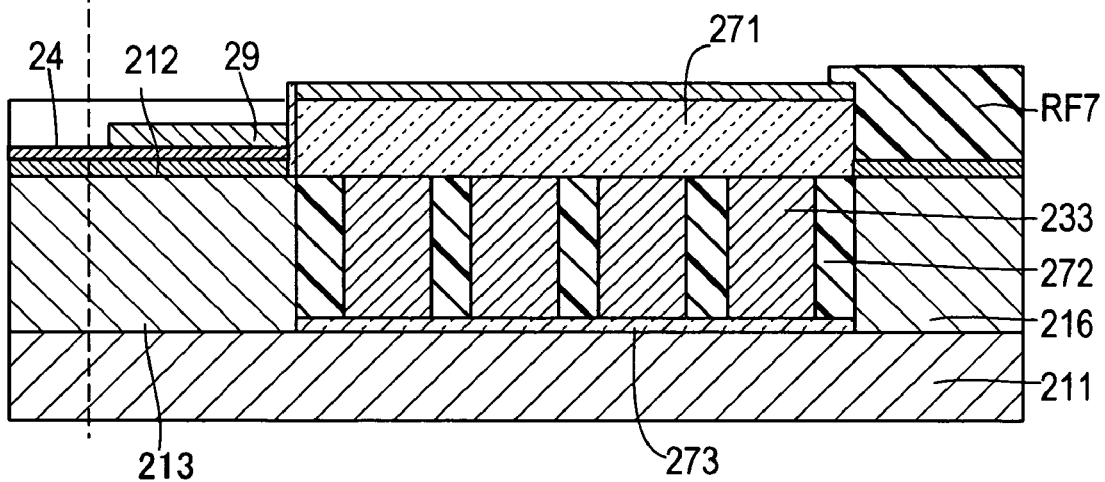
Figure 46:
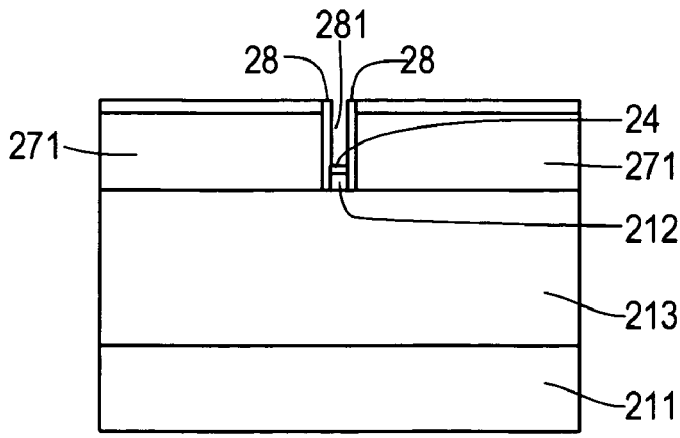
Figure 47:
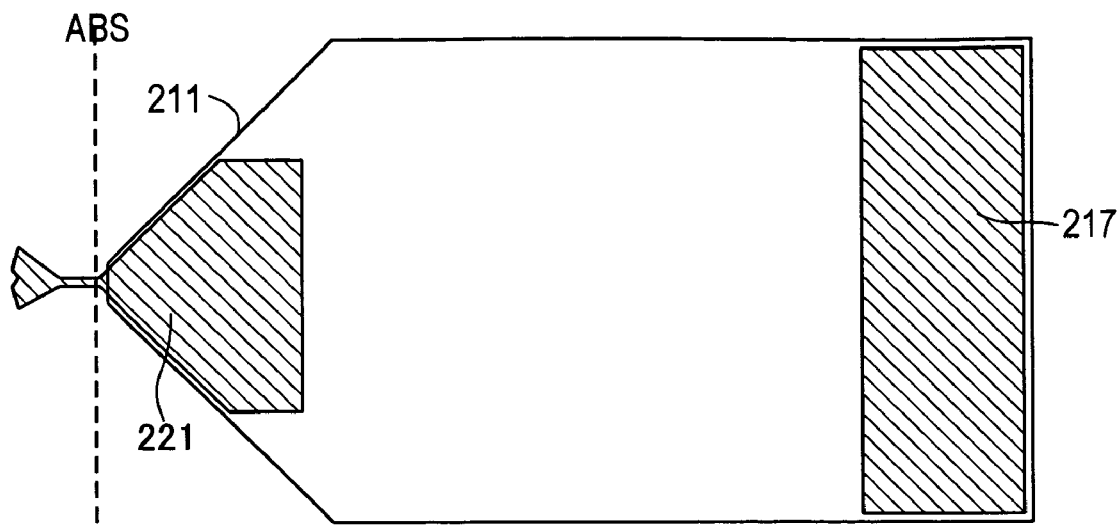
Figure 48:
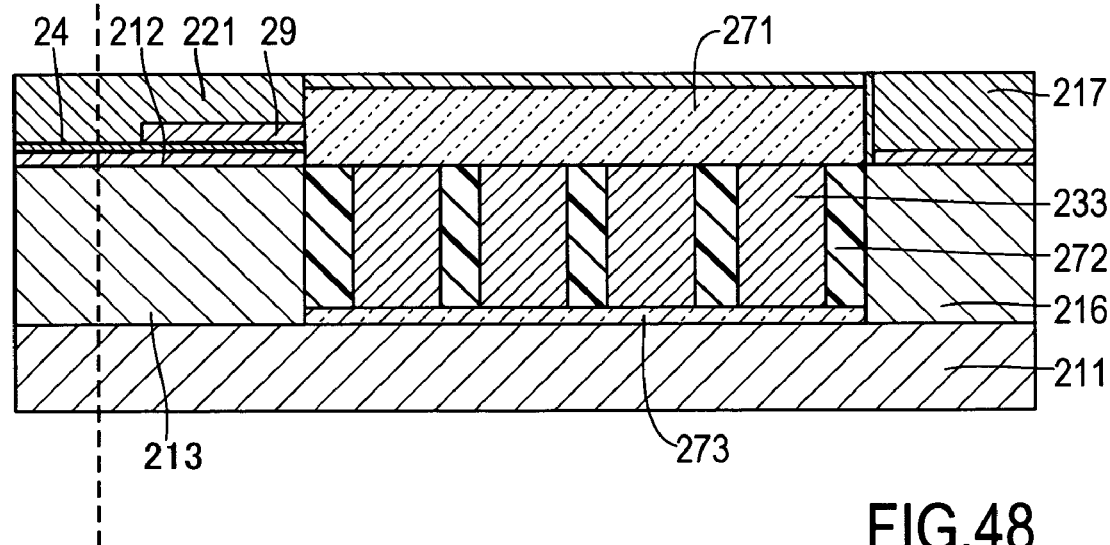
Figure 49:
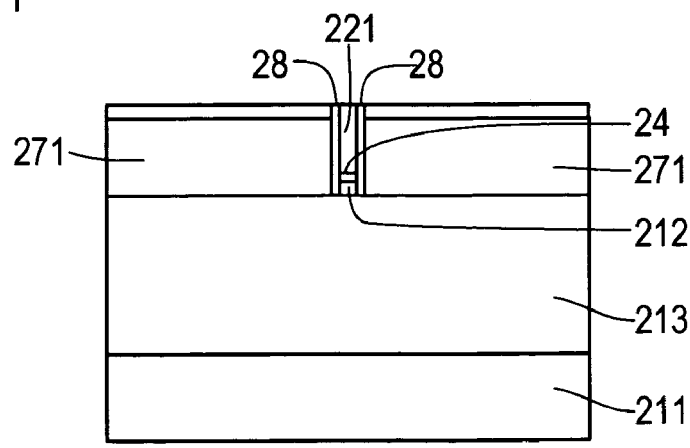

Next, as shown in FIGS. 44 to 46, a non-magnetic film 29 for determining a throat height is formed on the gap film 24, and further as shown in FIGS. 47 to 49, a first upper pole film 221 is formed by applying a plating method. At this time a second back gap film 217 is also formed simultaneously. The first upper pole film 221 and the second back gap film 217 each can be also formed as a plated film of NiFe (80%:20%), NiFe (45%:55%) or CoNiFe (23 kG, 21 kG).

The first upper pole film 221 also results in being formed inside the narrow-width portion 281 of the trench portion (281, 282) set at a very narrow value with a super-high accuracy by the attached film 28. Due to this, a first upper pole film 221 having a track width so narrow as not to be realizable at all by the prior art, said track width being controlled in angstroms, results in being obtained. Since the attached film 28 can be set within a range of 5 to 50 nm in thickness, the track width of the first upper pole film 221 can be controlled finely within this range.

Moreover, since a high-accuracy and super-fine process using an attached film 28 is also reflected directly in a flare point, it is possible to set the distance from the medium facing surface to the flare point at a short value determined in angstroms with a high accuracy (see FIG. 8).

Figure 50:
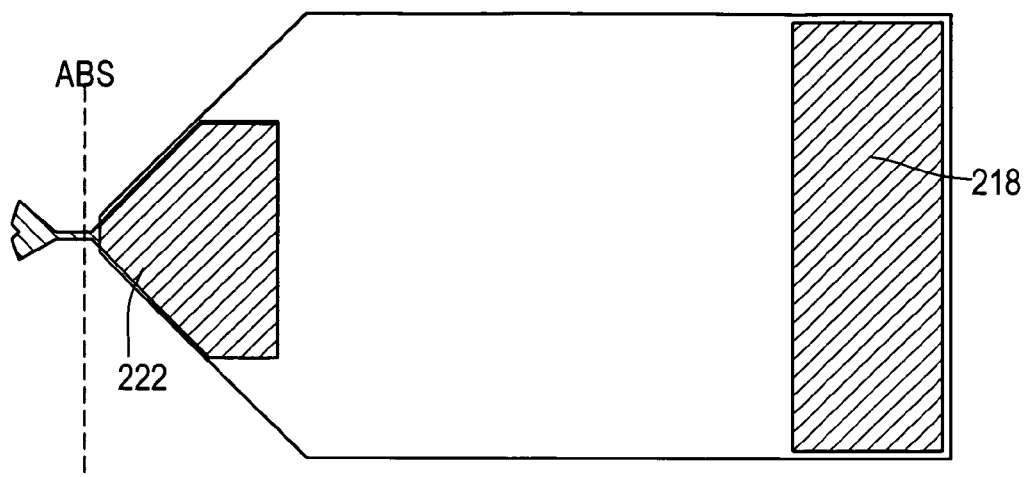
Figure 51:
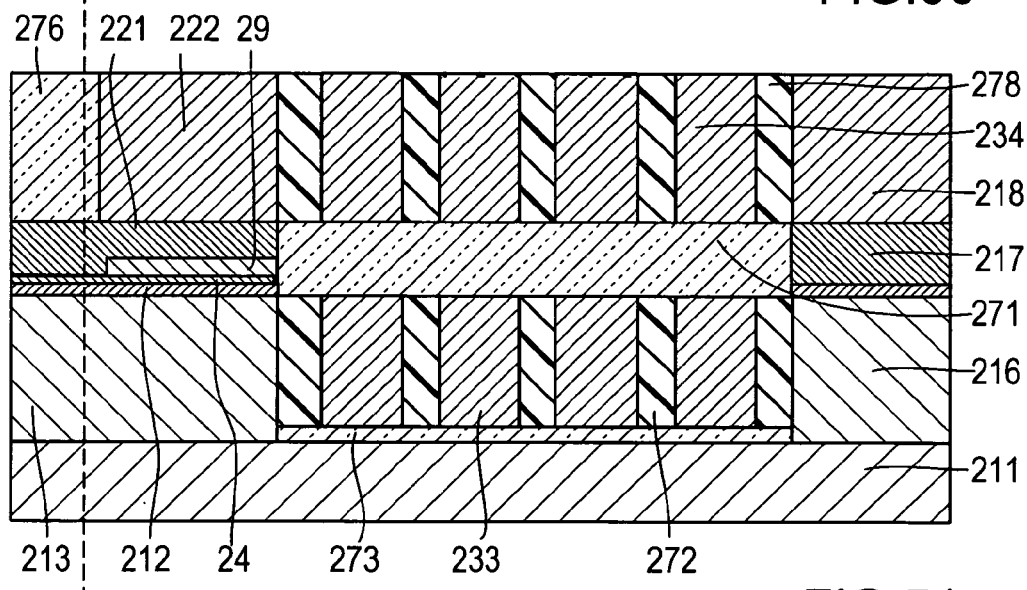
Figure 52:
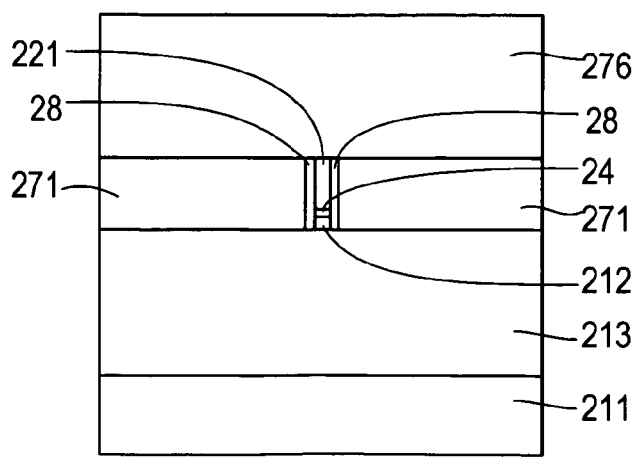
Figure 53:
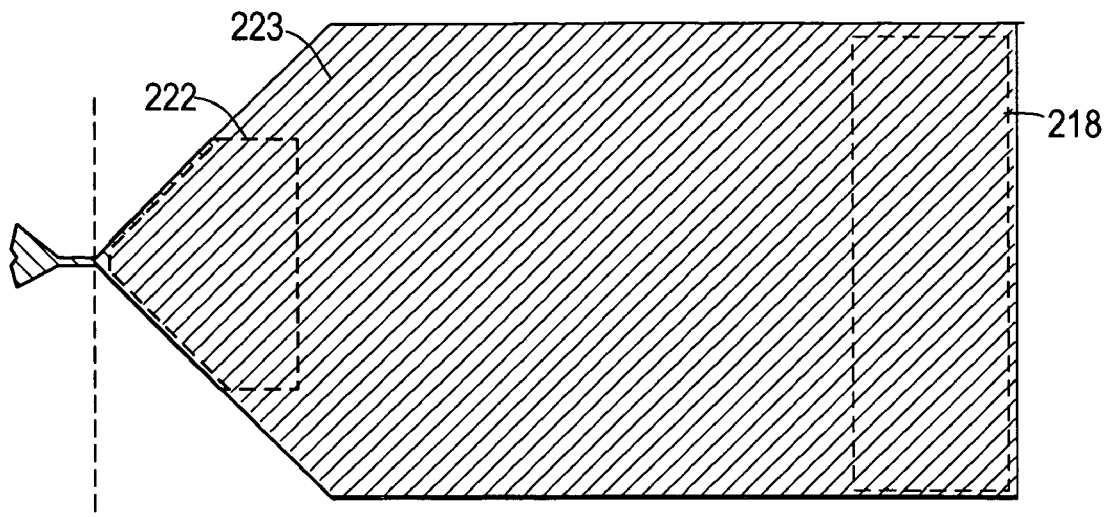
Figure 54:
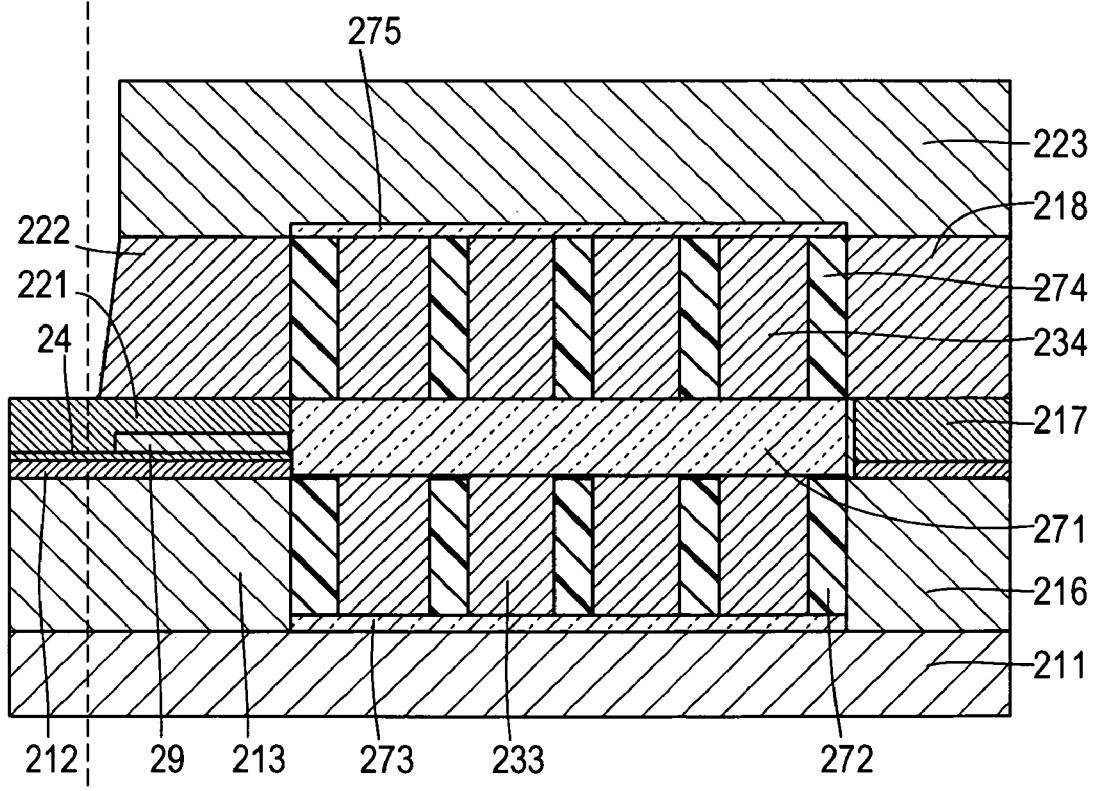

Next, as shown in FIGS. 50 to 52, a second upper pole film 222, a third back gap film 218, a second thin-film coil 234 and a fourth insulating film 274 are formed according to ordinary processes. And the surfaces of the second upper pole film 222, the third back gap film 218, the second thin-film coil 234 and the fourth insulating film 274 are flattened by CMP, and after a fifth insulating film 275 is formed on them, as shown in FIGS. 53 and 54, a upper yoke film 223 for magnetically connecting the second upper pole film 222 with the third back gap film 218 is formed on the surface of the fifth insulating film 275. The upper yoke film 223 is formed by a pattern plating method using NiFe, CoNiFe or the like. After this, an insulating film 277 for protection is formed by sputtering or the like.

Embodiment 3 of a Manufacturing Method

Embodiment 3 of a manufacturing method is shown in FIGS. 55 to 71. This manufacturing method is directed to manufacturing the thin-film magnetic head shown in FIGS. 12 to 14.

Figure 55:
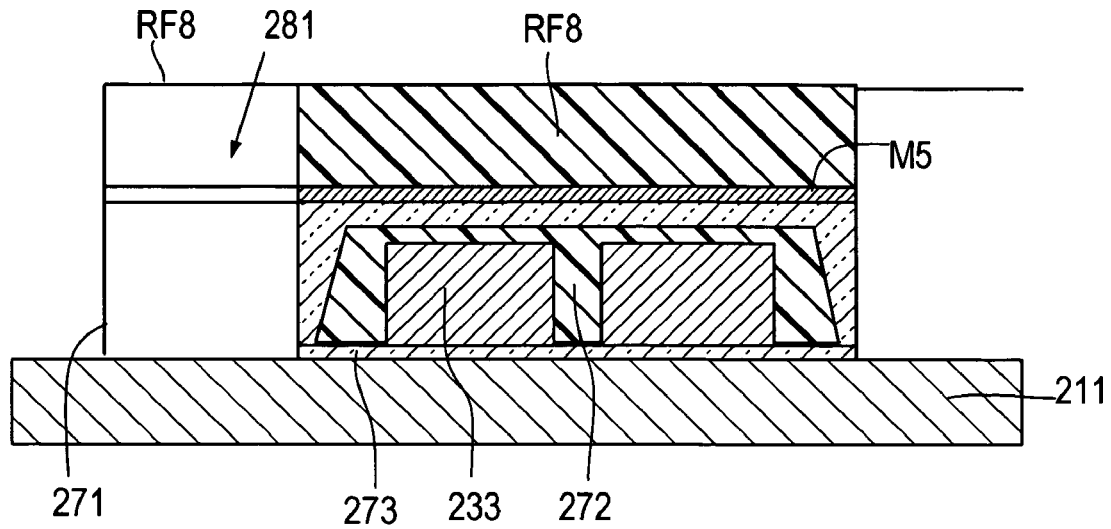
FIGS. 55 to 71 are diagrams showing a method of manufacturing a thin-film magnetic head having the write element shown in FIGS. 12 to 14.
Figure 56:
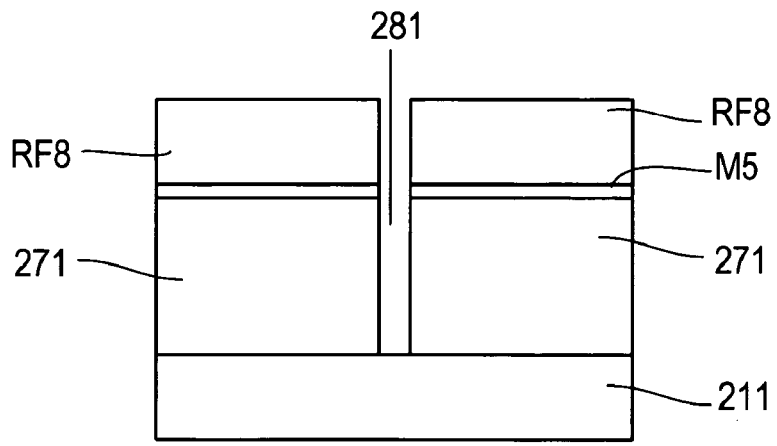

First, referring to FIGS. 55 and 56, a first thin-film coil 233 and a first insulating film 271 have been already formed on the surface of a lower yoke film 211, and a trench portion (281, 282) has been already formed in the first insulating film 271. The first thin-film coil 233 is electrically insulated from the lower yoke film 211 by a third insulating film 273, and further the periphery of it is filled up with a second insulating film 272. The periphery of the second insulating film 272 is further covered with the first insulating film 271. A protective film M5 and a resist frame RF8 used for forming the trench portion (281, 282) have been attached onto the surface of the first insulating film 271.

Next, the resist frame RF8 is removed by a well known means and an attached film 28 made of an Al-CVD film formed by an atomic layer method is formed on the inner faces of the trench portion (281, 282), and further the attached film 28 on the inner bottom of the trench portion (281, 282) is removed to expose the lower yoke film 211. And a lower pole film 212 is formed on the lower yoke film 211 by a plating method using the lower yoke film 211 as a seed electrode. Due to this, a thin-film magnetic head having a track width so narrow as not to be realizable at all by the prior art, said track width being controlled in angstroms, results in being obtained. Since the attached film 28 can be set within a range of 5 to 50 nm, the track width of the lower pole film 212 can be controlled finely within this range.

Figure 57:
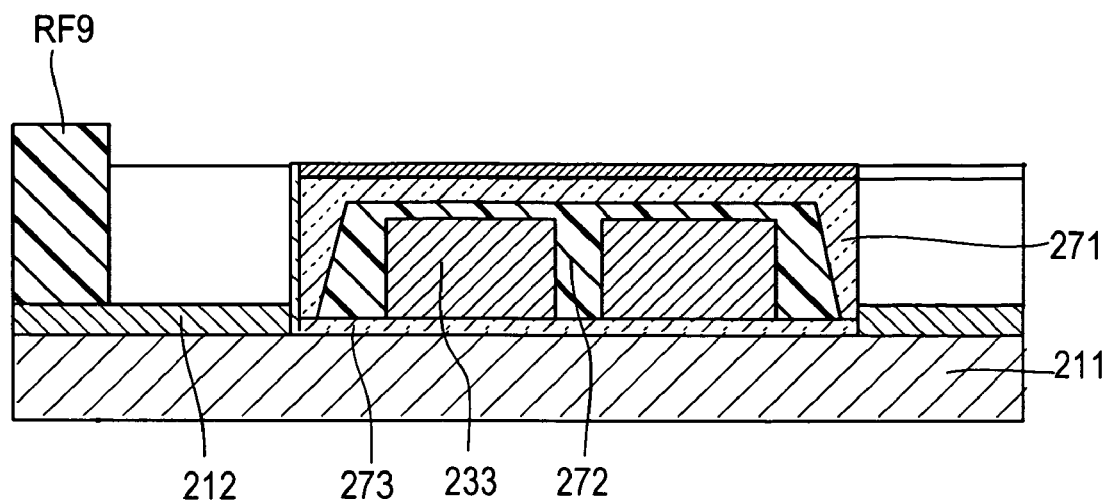
Figure 58:
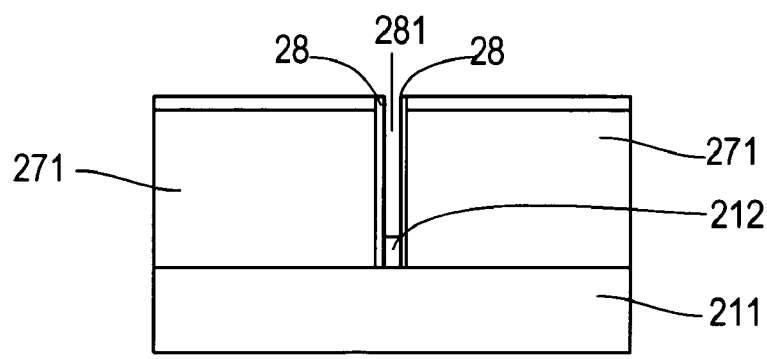
Figure 59:
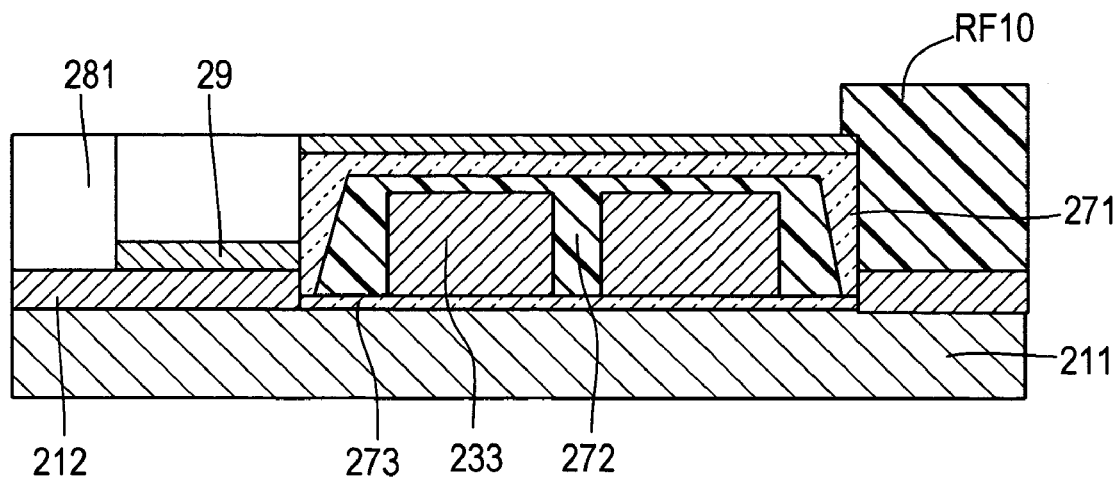
Figure 60:
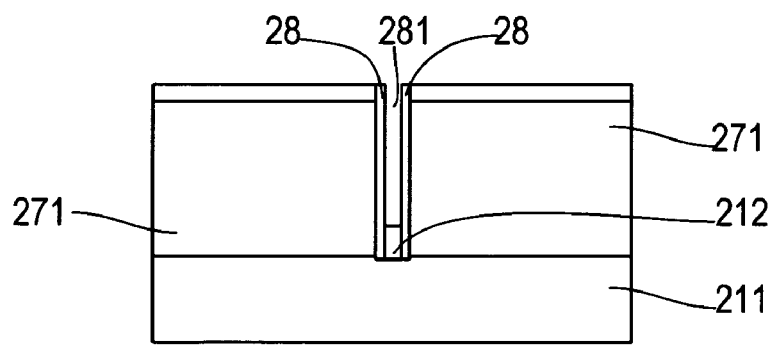

Next, as shown in FIGS. 57 and 58, after a resist frame RF9 having a necessary pattern is formed, a non-magnetic film 29 for determining a throat height is formed by plating. A resist frame RF10 comes also into the trench portion (281, 282). FIGS. 59 and 60 show a state where the non-magnetic film 29 has been formed.

Figure 61:
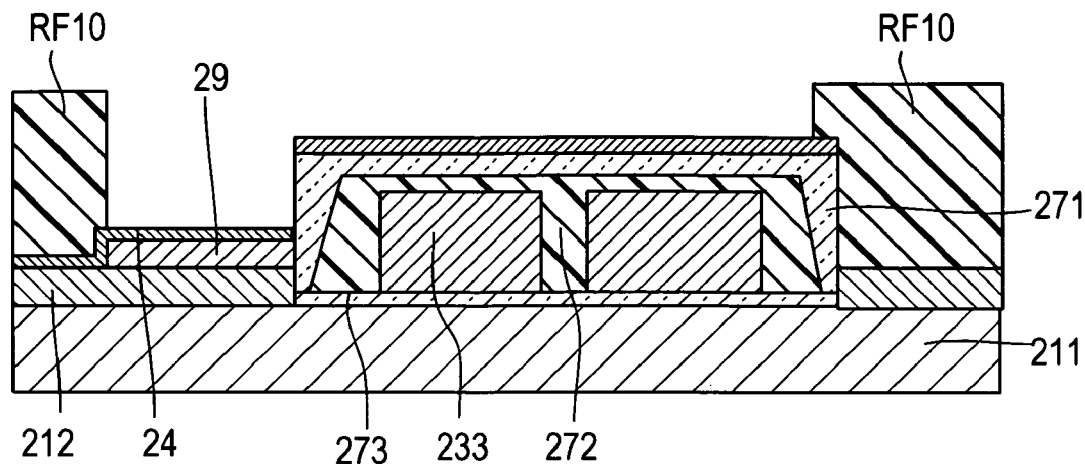
Figure 62:
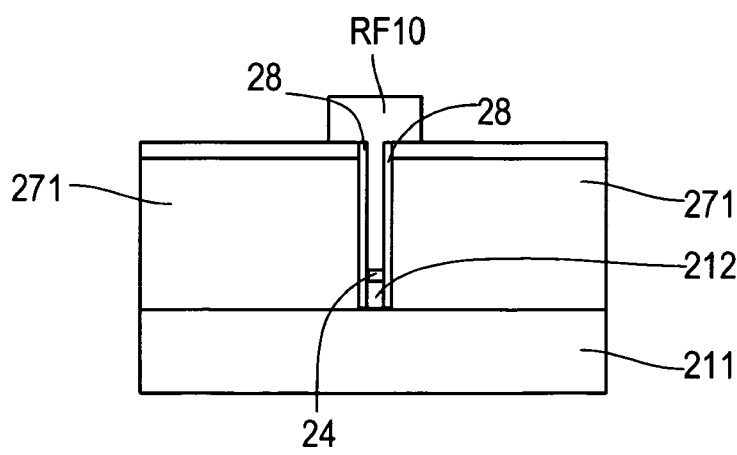

Next, as shown in FIGS. 61 and 62, a gap film 24 is formed on the lower pole film 212 and the non-magnetic film 29 by a plating method. Since the gap film 24 is formed by plating, a non-magnetic conductive material of Ru, NiCu, Ta or the like is used. The gap film 24 also results in being formed inside the narrow-width portion 281 of the trench portion (281, 282), said narrow-width portion 281 being set at a very narrow value with a super-high accuracy by the attached film 28.

Figure 63:
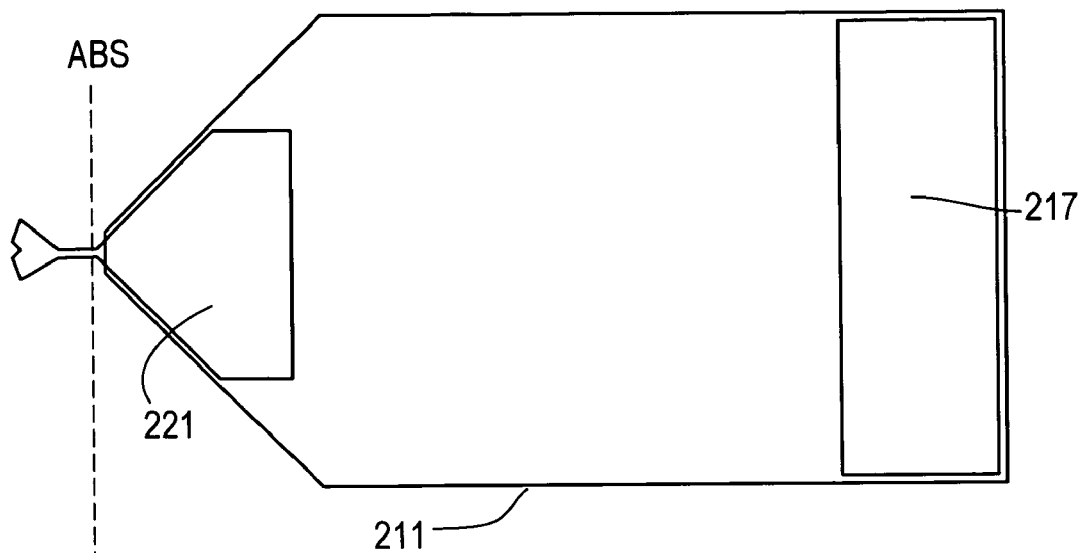
Figure 64:
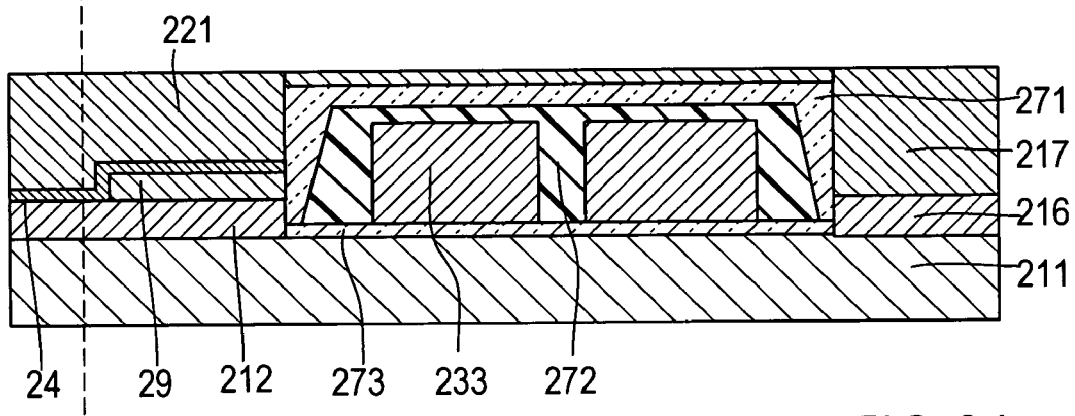
Figure 65:
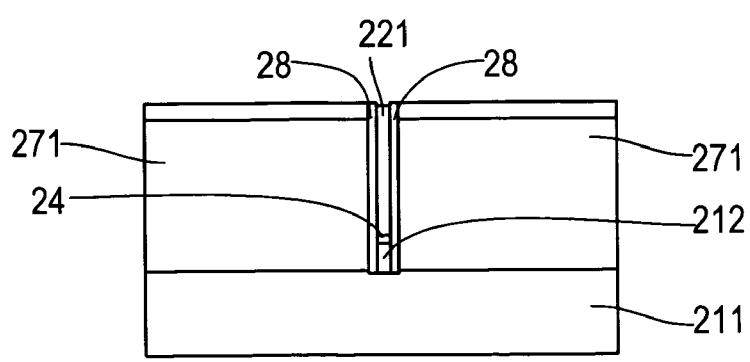

Next, as shown in FIGS. 63 to 65, a first upper pole film 221 is formed by applying a plating method on the surfaces of the gap film 24 and the first back gap film 216. The first upper pole film 221 also results in being formed inside the trench portion (281, 282) set at a very narrow value with a super-high accuracy by the attached film 28. Due to this, a first upper pole film 221 having a track width so narrow as not to be realizable at all by the prior art, said track width being controlled in angstroms, results in being obtained.

Moreover, since a high-accuracy and super-fine process using an attached film 28 is also reflected directly in defining a flare point, it is possible to set the distance from the medium facing surface to the flare point at a short value with a high accuracy determined in angstroms at the first upper pole film 221 (see FIG. 8).

Figure 66:
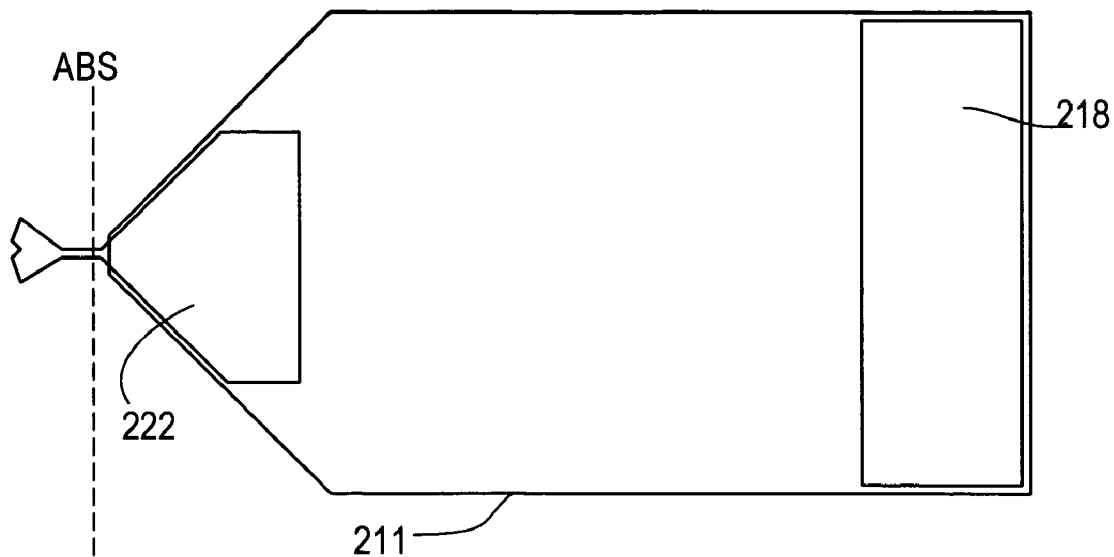
Figure 67:
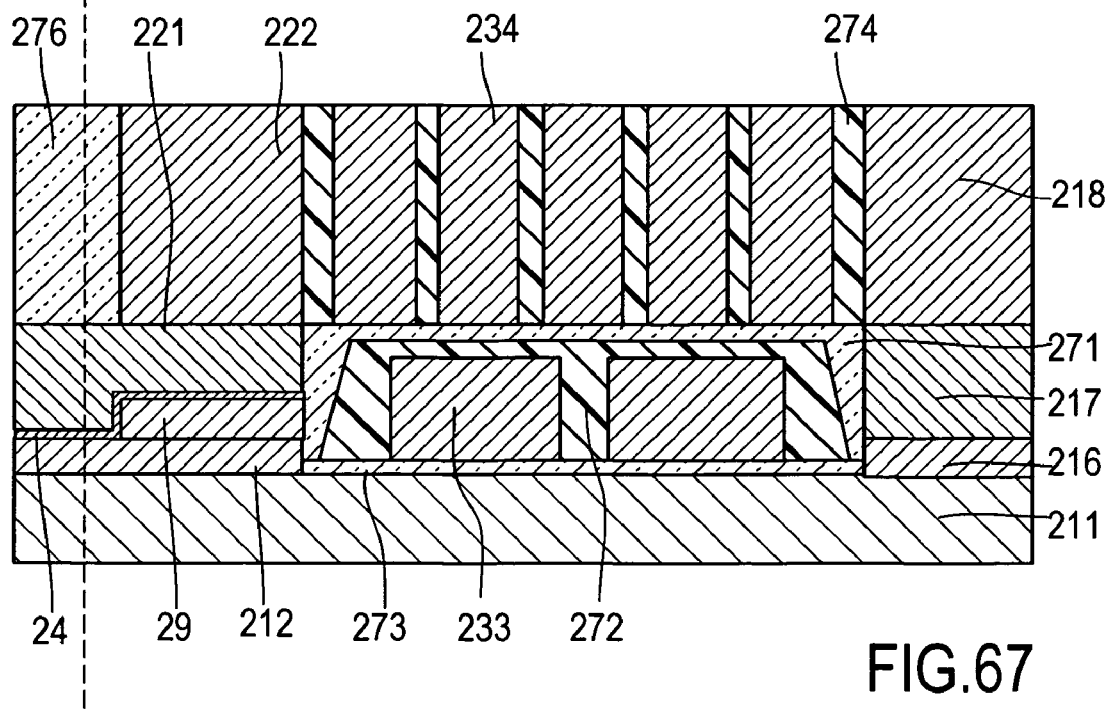
Figure 68:
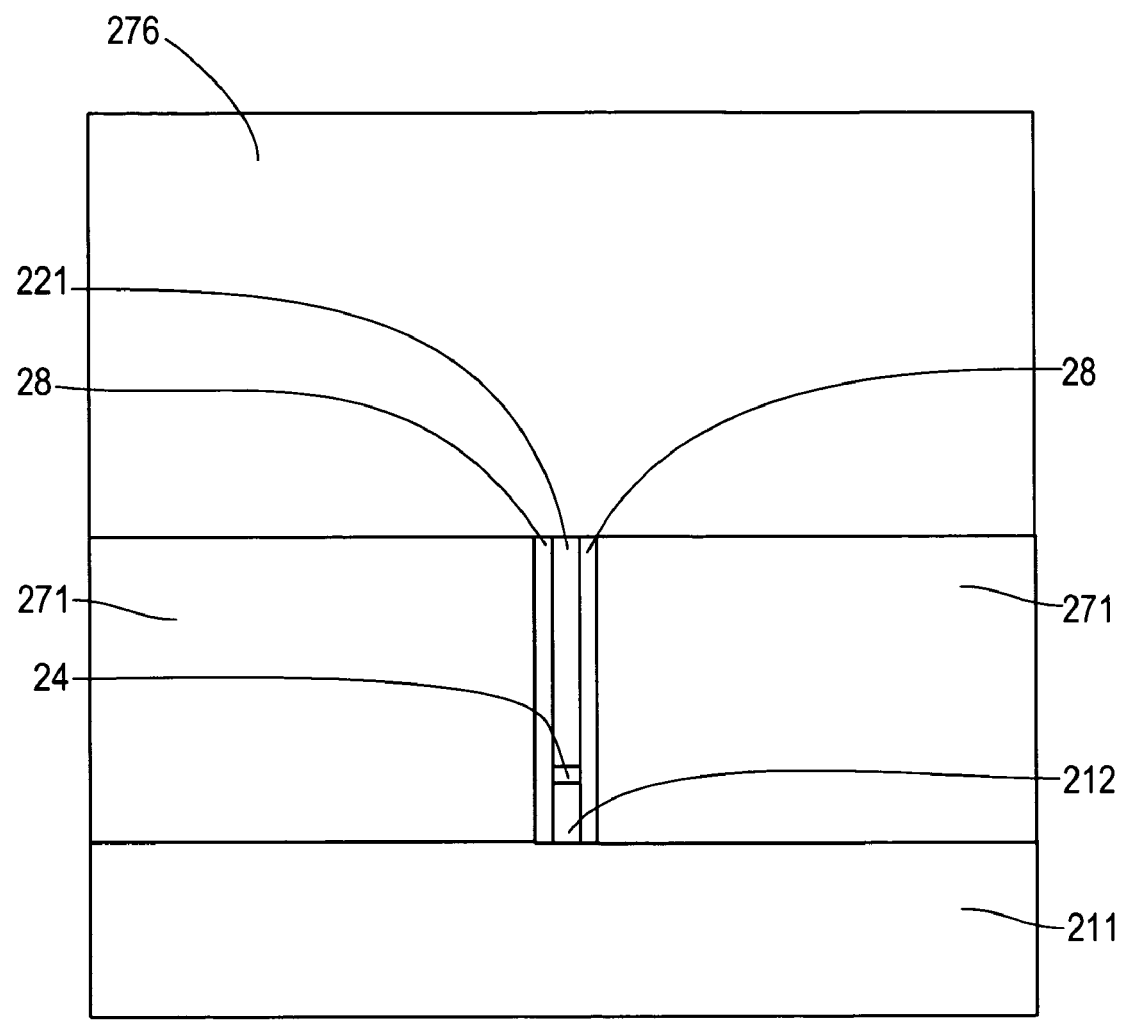
Figure 69:
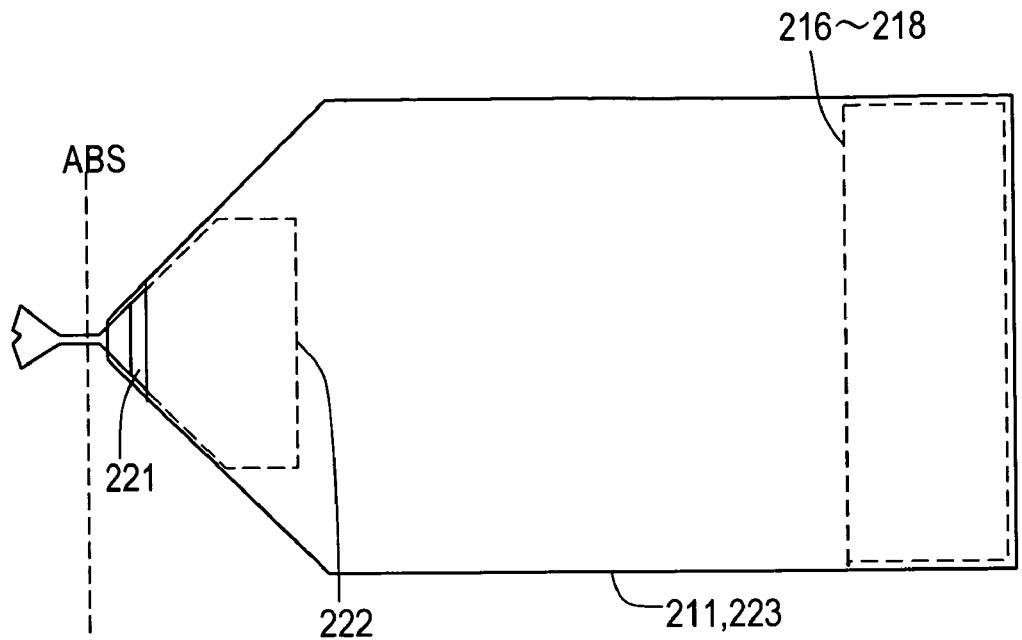
Figure 70:
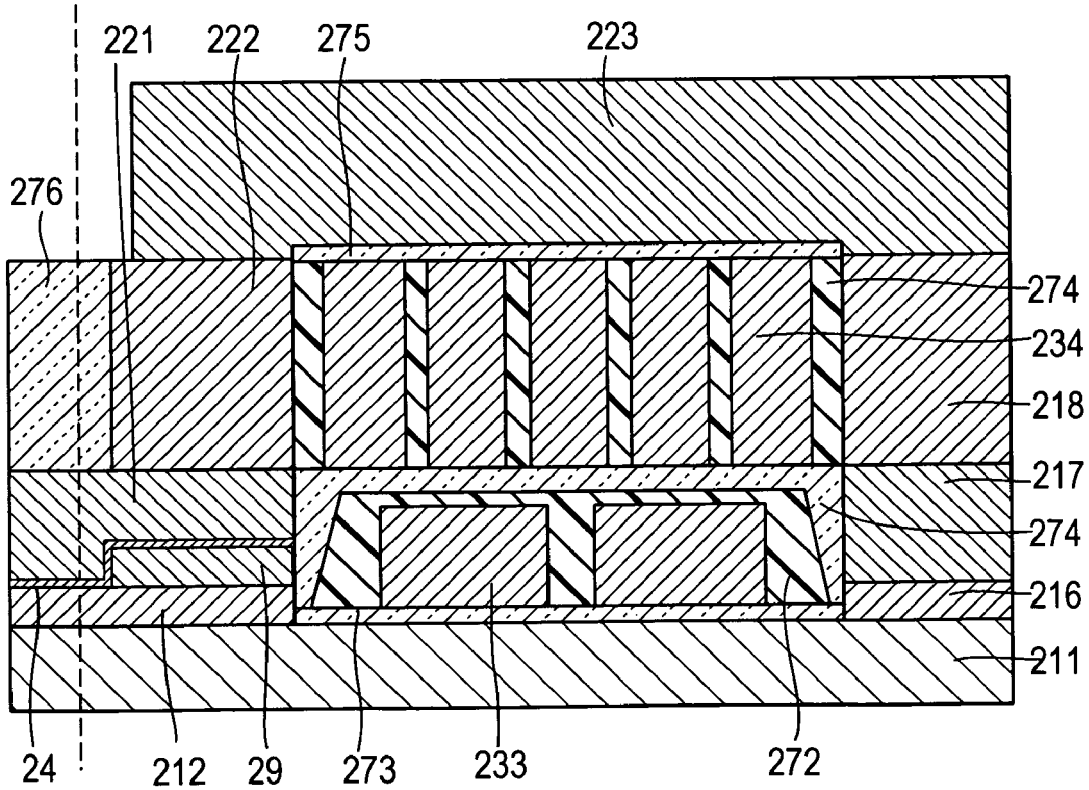
Figure 71:
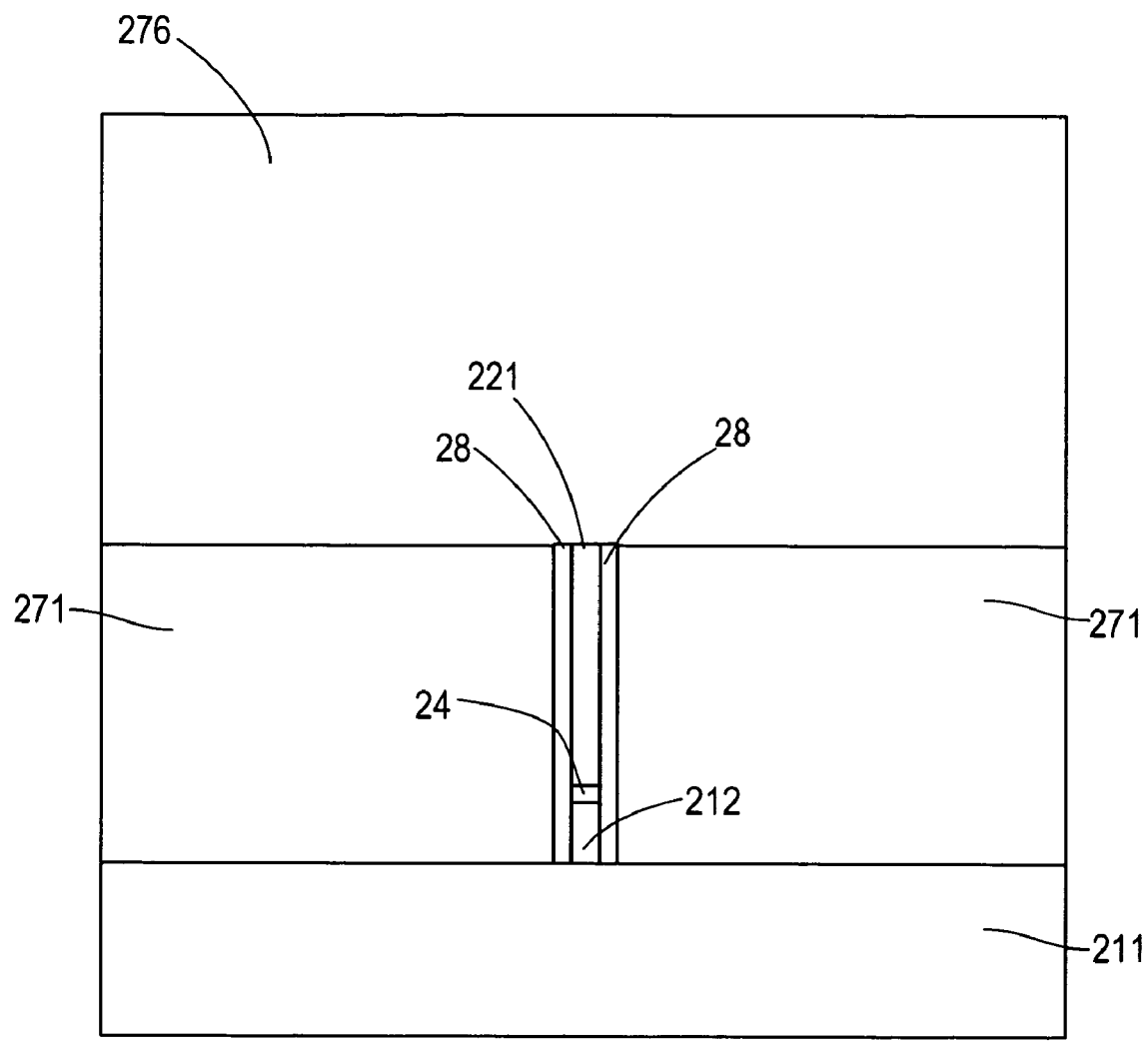

Next, as shown in FIGS. 66 to 68, a second upper pole film 222, a third back gap film 218, a second thin-film coil 234, and fourth and fifth insulating films 274 and 275 are formed according to ordinary processes, and further as shown in FIGS. 69 to 71 a upper yoke film 223 for magnetically connecting the second upper pole film 222 with the third back gap film 218 is formed on the surface of the fifth insulating film 275. The upper yoke film 223 is formed as a pattern-plated film of NiFe, CoNiFe or the like. After this, an insulating film 277 for protection is formed by sputtering or the like.

<Others>

Figure 72:
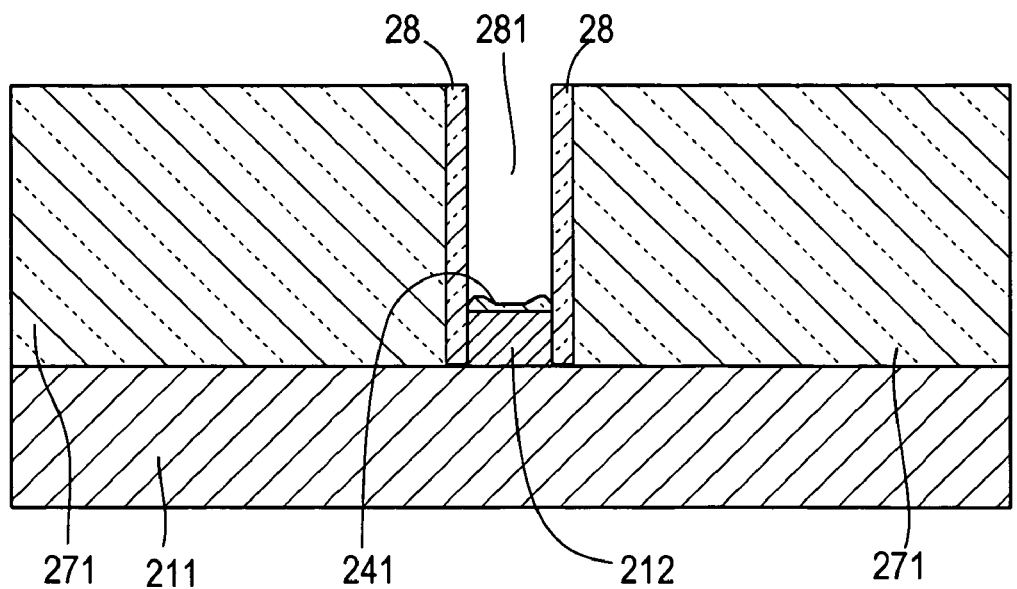
FIG. 72 is a diagram showing a process of forming a gap film.
Figure 73:
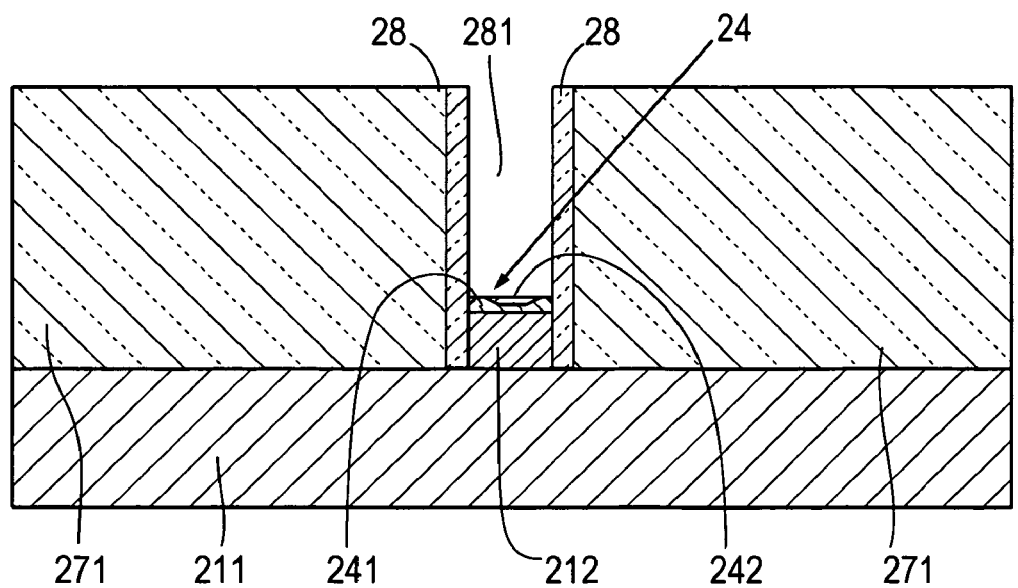
FIG. 73 is a diagram showing a process after the process shown in FIG. 72.

By the way, a two-stage plating method shown in FIGS. 72 and 73 is effective as a method of forming a gap film 24 having a uniform thickness inside a narrow-width portion 281 by plating. Ordinarily, the first plating process 241 makes the surface of a plated film undulate, as shown in FIG. 72. Thereupon, after the first plating process has ended, the second plating process 242 is performed. Due to this, a gap film 24 being uniform in thickness is formed as shown in FIG. 73.

3. Magnetic Head Device and Magnetic Recording/Reproducing Apparatus

Figure 74:
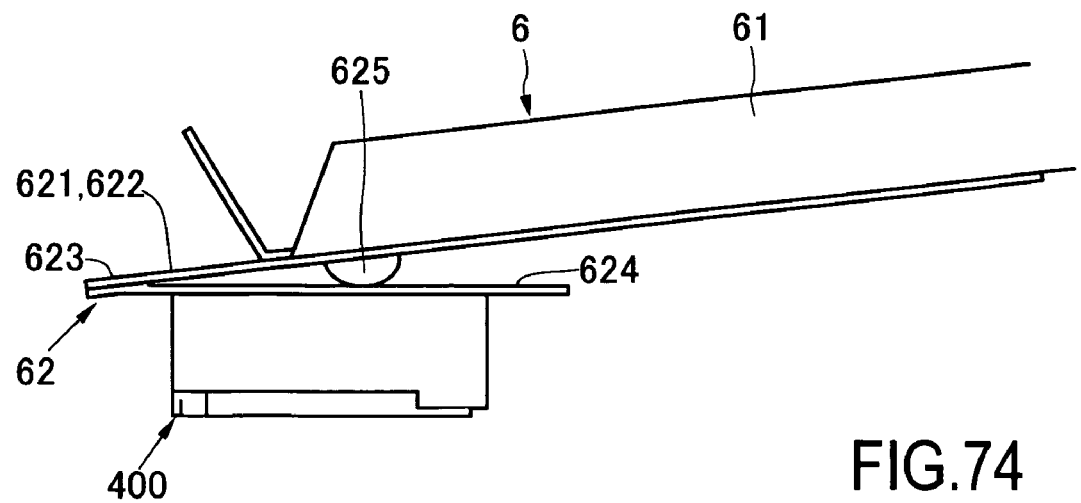
FIG. 74 is a front view of a magnetic head device using a thin-film magnetic head according to the present invention.
Figure 75:
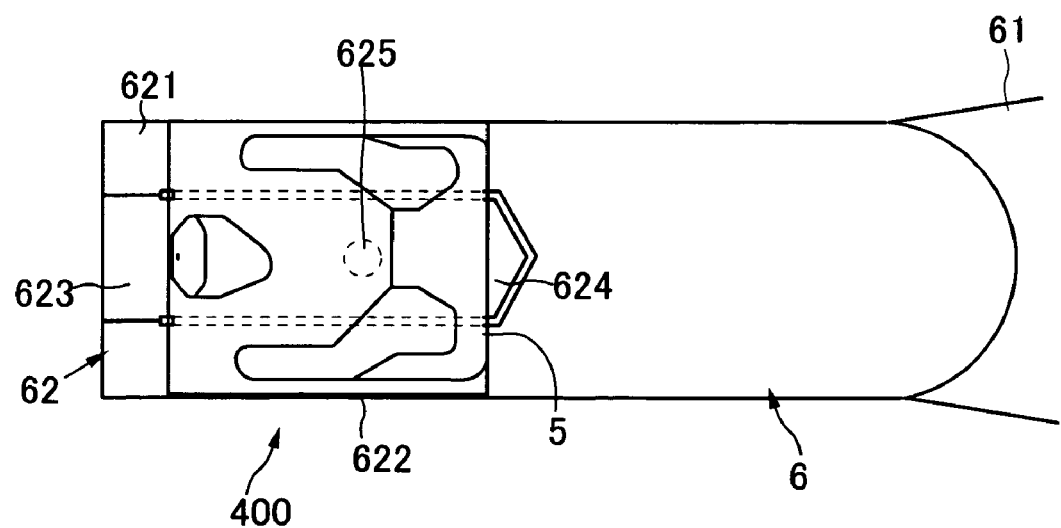
FIG. 75 is a bottom view of the magnetic head device shown in FIG. 74.

The present invention further discloses also a magnetic head device and a magnetic recording/reproducing apparatus. Referring to FIGS. 74 and 75, a magnetic head device according to the present invention comprises a thin-film magnetic head 400 shown in FIGS. 1 to 14 and a head supporting device 6. The head supporting device 6 has a structure in which a flexible member 62 made of sheet metal is attached to a free end being one end in the longitudinal direction of a supporting member 61 made of sheet metal also and the thin-film magnetic head 400 is attached to the lower surface of this flexible member 62.

Concretely, the flexible member 62 has two outer frame portions 621 and 622 extending nearly in parallel with the longitudinal axial line of the supporting member 61, a lateral frame 623 for connecting the outer frame portions 621 and 622 at the end being distant from the supporting member 61, and a tongue-shaped piece 624 extending nearly from the middle part of the lateral frame 623 nearly in parallel with the outer frame portions 621 and 622 and having the tip made free. One end opposite to the lateral frame 623 is joined to the vicinity of the free end of the supporting member 61 by means of welding or the like.

The lower face of the supporting member 61 is provided with a loading projection 625 in the shape of a hemisphere, for example. This loading projection 625 transfers load from the free end of the supporting member 61 to the tongue-shaped piece 624.

The thin-film magnetic head 400 is joined to the lower surface of the tongue-shaped piece 624 by means of adhesion or the like. The thin-film magnetic head 400 is supported so that pitching and rolling actions are permitted.

A head supporting device 6 applicable to the present invention is not limited to the above-described embodiment but head supporting devices which have been proposed up to now or will be proposed in the future can be applied widely. For example, a member obtained by forming the supporting member 61 and the tongue-shaped piece 624 into one body by means of a flexible high-molecular wiring plate such as a TAB tape (TAB: tape automated bonding) and the like can be used. And a member having a well known conventional gimbals structure can be used freely.

Figure 76:
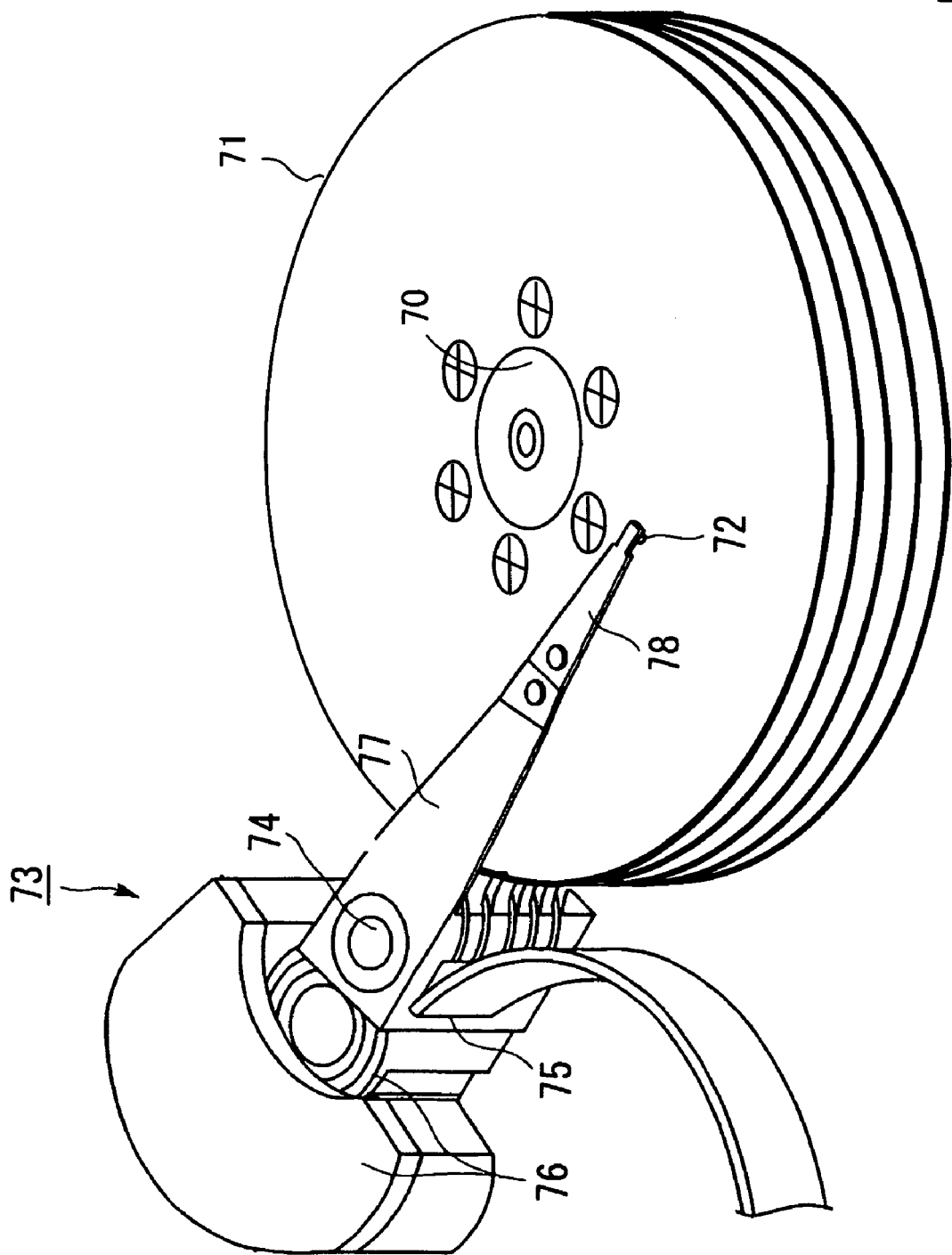
FIG. 76 is a diagram showing a magnetic disk apparatus using the magnetic head device shown in FIGS. 74 and 75.

Next, referring to FIG. 76, a magnetic recording and reproducing apparatus according to the present invention comprises a magnetic disk 71 provided so as to be capable of turning around an axis 70, a thin-film magnetic head 72 for recording and reproducing information on the magnetic disk 71 and an assembly carriage device 73 for positioning the thin-film magnetic head 72 on a track of the magnetic disk 71.

The assembly carriage device 73 is mainly composed of a carriage 75 capable of turning around an axis 74 and an actuator 76 composed of, for example, a voice coil motor (VCM) for driving this carriage 75 to turn.

The base portion of a plurality of driving arms 77 stacked in the axial direction of the axis 74 is attached to the carriage 75, and a head suspension assembly 78 mounted with a thin-film magnetic head 72 is fixedly joined to the tip of each driving arm 77. Each head suspension assembly 78 is joined to the tip of a driving arm 77 so that a thin-film magnetic head 72 mounted on the tip of the head suspension assembly 78 faces the surface of each magnetic disk 71.

The driving arm 77, the head suspension assembly 78 and the thin-film magnetic head 72 form the magnetic head device described with reference to FIGS. 74 and 75. The thin-film magnetic head 72 has the structure shown in FIGS. 1 to 14. Therefore, the magnetic recording and reproducing apparatus shown in FIG. 76 exhibits the actions and effects described with reference to FIGS. 1 to 14.

While the present invention has been particularly shown and described with reference to preferred embodiments thereof, it will be understood by those skilled in the art that various changes in form and detail may be made therein without departing from the spirit, scope and teaching of the invention.

What is claimed is:

1. A thin-film magnetic head comprising a write element, wherein:
    said write element comprises a lower yoke film, a first insulating film, a lower pole film, a gap film, and an upper pole film;
    said first insulating film is made of an inorganic insulating material, is provided on the surface of said lower yoke film and has a trench portion at least at a part corresponding to a magnetic pole end portion, and the surface of said lower yoke film is exposed in the bottom of said trench portion;
    said lower pole film is provided on said surface of said lower yoke film in the bottom of said trench portion;
    said gap film is a conductive non-magnetic film and is provided on the surface of said lower pole film inside said trench portion;
    said upper pole film is provided on the surface of said gap film inside said trench portion;
    said trench portion has a non-magnetic film made of a non-magnetic material on the inner side faces of the trench portion;
    a magnetic pole end portion of said lower pole film and a magnetic pole end portion of said upper pole film have a track width reduced by said non-magnetic film;
    said non-magnetic film is an Al-CVC film using an atomic layer method; and
    said Al-CVD film is within a range of 5 to 50nm in thickness.

2. A thin-film magnetic head according to claim 1, wherein said lower pole film, said gap film and said upper pole film each are plated films.

3. A thin-film magnetic head according to claim 1, wherein said non-magnetic film has $Al_2O_3$ as its main ingredient.

4. A thin-film magnetic head according to claim 1, wherein:
    said trench portion comprises a narrow-width portion and a wide-width portion;
    said narrow-width portion is a part for containing a magnetic pole end portion of said lower pole film and a magnetic pole end portion of said upper pole film;
    said wide-width portion is continuous to the rear of said narrow-width portion; and
    said lower pole film is continuous in said narrow-width potion and said wide-width portion.

5. A thin-film magnetic head according to claim 4, wherein:
    said gap film is continuous in said narrow-width potion and said wide-width portion.

6. A thin-film magnetic head according to claim 1, wherein:
    said upper pole film is expanded in area at the rear and the distance from a flare point to be the starting point of expansion in area to a surface facing a medium is within a range of 0.1 to 0.5 µm.

7. A thin-film magnetic head comprising a write element, wherein
    said write element comprises a lower yoke film, a first insulating film, a lower pole film, a gap film, an upper pole film, and a non-magnetic film for determining a throat height at the rear of said upper pole film;
    said first insulating film is made of an inorganic insulating material, is provided on the surface of said lower yoke film and has a trench portion at least at a part corresponding to a magnetic pole end portion, and the surface of said lower yoke film is exposed in the bottom of said trench portion;
    said lower pole film is provided on said surface of said lower yoke film in the bottom of said trench portion;
    said gap film is a conductive non-magnetic film and is provided on the surface of said lower pole film inside said trench portion;
    said upper pole film is provided on the surface of said gap film inside said trench portion; and
    said non-magnetic film is provided on said gap film.

8. A thin-film magnetic head according to claim 7, wherein said non-magnetic film has the front part provided on said lower pole film and has the rear part rising up from said front part.

9. A thin-film magnetic head comprising a write element, wherein:
    said write element comprises a lower yoke film, a first insulating film, a lower pole film, a gap film, an upper pole film, an upper yoke film, and a thin-film coil;
    said first insulating film is made of an inorganic insulating material, is provided on the surface of said lower yoke film and has a trench portion at least at a part corresponding to a magnetic pole end portion, and the surface of said lower yoke film is exposed in the bottom of said trench portion;
    said lower pole film is provided on said surface of said lower yoke film in the bottom of said trench portion;

said gap film is a conductive non-magnetic film and is provided on the surface of said lower pole film inside said trench portion;

said upper pole film is provided on the surface of said gap film inside said trench portion;

said upper yoke film connects magnetically said upper pole film with the rear of said lower yoke film;

said thin-film coil excites a magnetic circuit going round through said lower yoke film, said lower pole film, said gap film, said upper pole film and said upper yoke film;

the space between the junction of said upper pole film with said lower yoke film and said lower pole film, said gap film and said upper pole film is filled up with a second insulating film;

said thin-film coil is formed on said surface of said second insulating film; and the upper surfaces of said second insulating film and said upper pole film are flattened so as to be in the same plane.

10. A thin-film magnetic head comprising a write element, wherein:

said write element comprises a lower yoke film, a first insulating film, a lower pole film, a gap film, an upper pole film, an upper yoke film, and a thin-film coil;

said first insulating film is made of an inorganic insulating material, is provided on the surface of said lower yoke film and has a trench portion at least at a part corresponding to a magnetic pole end portion, and the surface of said lower yoke film is exposed in the bottom of said trench portion;

said lower pole film is provided on said surface of said lower yoke film in the bottom of said trench portion;

said gap film is a conductive non-magnetic film and is provided on the surface of said lower pole film inside said trench portion;

said upper pole film is provided on the surface of said gap film inside said trench portion said upper yoke film connects magnetically said upper pole film with the rear of said lower yoke film;

said thin-film coil excites a magnetic circuit going round through said lower yoke film, said lower pole film, said gap film, said upper pole film and said upper yoke film;

said lower yoke film comprises a first lower yoke film and a second lower yoke film;

said first lower yoke film has a surface forming a flat face;

said second lower yoke film is provided at a limited position on said surface of said first lower yoke film;

said lower pole film, said gap film and said upper pole film are provided on the surface of said second lower yoke film;

said thin-film coil comprises a first thin-film coil and a second thin-film coil;

said first thin-film coil is provided between the junction of said upper pole film with said lower yoke film and said second lower yoke film;

on said first thin-film coil, the space between the junction of said upper pole film with said lower yoke film and said lower pole film, said gap film and said upper pole film is filled up with said first insulating film; and said second thin-film coil is provided on said first insulating film.

11. A thin-film magnetic head according to claim 10, wherein:

the surfaces of said first insulating film and said upper pole film are flattened.

12. A thin-film magnetic head according to claim 11, further comprising a second upper pole film, wherein:

said second upper pole film is provided on said first upper pole film; and the surfaces of said second upper pole film and said second thin-film coil are flattened so as to be in the same plane.

13. A thin-film magnetic head according to claim 1, further comprising a read element.

14. A thin-film magnetic head according to claim 13, wherein said read element comprises a GMR element or a ferromagnetic tunnel junction film.

15. A magnetic recording and reproducing apparatus comprising a thin-film magnetic head and a magnetic recording medium, wherein:

said thin-film magnetic head comprises a write element;

said write element comprises a lower yoke film, a first insulating film, a lower pole film, a gap film and an upper pole film;

said first insulating film is made of an inorganic insulating material, is provided on the surface of said lower yoke film and has a trench portion at least at a part corresponding to a magnetic pole end portion, and the surface of said lower yoke film is exposed in the bottom of said trench portion;

said lower pole film is provided on said surface of said lower yoke film in the bottom of said trench portion;

said gap film is a conductive non-magnetic film and is provided on the surface of magnetic pole end portion of said lower pole film inside said trench portion;

said upper pole film is provided on the surface of said gap film inside said trench portion;

said trench portion has a non-magnetic film made of a non-magnetic material on the inner side faces of the trench portion;

said magnetic pole end portion of said lower pole film and said magnetic pole end portion of said upper pole film have a track width reduced by said non-magnetic film each;

said non-magnetic film is an Al-CVD film using an atomic layer method;

said Al-CVD film is within a range of 5 to 50 nm in thickness; and said thin-film magnetic head performs magnetic recording and reproduction with said magnetic recording medium.

16. A magnetic recording and reproducing apparatus according to claim 15, wherein:

said lower pole film, said gap film and said upper pole film each are plated films.

17. A magnetic recording and reproducing apparatus according to claim 15, wherein:

said non-magnetic film is a CVD film.

18. A thin-film magnetic head according to claim 5, wherein:

said non-magnetic film has $Al_2O_3$ as its main ingredient.

19. A magnetic recording and reproducing apparatus according to claim 15, wherein:

said trench portion comprises a narrow-width portion and a wide-width portion;

said narrow-width portion is a part for containing said magnetic pole end portion of said lower pole film and said magnetic pole end portion of said upper pole film;

said wide-width portion is continuous to the rear of said narrow-width portion; and said lower pole film is continuous in said narrow-width potion and said wide-width portion.

20. A magnetic recording and reproducing apparatus according to claim 19, wherein:

said gap film is continuous in said narrow-width potion and said wide-width portion.

21. A magnetic recording and reproducing apparatus according to claim 15, wherein:

said upper pole film is expanded in area at the rear and the distance from a flare point to be the starting point of expansion in area to a surface facing said medium is within a range of 0.1 to 0.5 μm.

22. A magnetic recording and reproducing apparatus according to claim 15, comprising a non-magnetic film for determining a throat height at the rear of said upper pole film.

23. A magnetic recording and reproducing apparatus according to claim 15, wherein:

said thin-film magnetic head further comprises a read element.

24. A magnetic recording and reproducing apparatus according to claim 23, wherein:

said read element comprises a GMR element or a ferromagnetic tunnel junction film.

* * * * *